(12) United States Patent
Kim et al.

(10) Patent No.: US 10,209,874 B2
(45) Date of Patent: Feb. 19, 2019

(54) METHOD AND DEVICE FOR OUTPUTTING CONTENT AND RECORDING MEDIUM FOR EXECUTING THE METHOD

(71) Applicant: SAMSUNG ELECTRONICS CO., LTD., Suwon-si (KR)

(72) Inventors: Jong-hyun Kim, Suwon-si (KR); Uk-jin Yang, Suwon-si (KR); Hyun-kwon Chung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 509 days.

(21) Appl. No.: 14/862,432

(22) Filed: Sep. 23, 2015

(65) Prior Publication Data

US 2016/0085432 A1    Mar. 24, 2016

(30) Foreign Application Priority Data

Sep. 24, 2014    (KR) .................. 10-2014-0127690

(51) Int. Cl.
*G06F 3/0485* (2013.01)
*H04N 5/76* (2006.01)
*G09B 7/02* (2006.01)

(52) U.S. Cl.
CPC ............. *G06F 3/0485* (2013.01); *G09B 7/02* (2013.01); *H04N 5/76* (2013.01)

(58) Field of Classification Search
CPC ......... G06F 3/0485; G09B 7/02; G09B 19/06; G09B 5/04; H04N 5/76
See application file for complete search history.

(56) References Cited

U.S. PATENT DOCUMENTS

| 2006/0147007 | A1 | 7/2006 | Lee et al. | |
|---|---|---|---|---|
| 2009/0023125 | A1* | 1/2009 | Berman | G09B 7/00 434/323 |
| 2009/0035733 | A1* | 2/2009 | Meitar | G09B 7/00 434/118 |
| 2012/0079400 | A1 | 3/2012 | Nauerz et al. | |

(Continued)

FOREIGN PATENT DOCUMENTS

| KR | 10-2006-0101561 A | 9/2006 |
|---|---|---|
| KR | 10-2011-0037597 A | 4/2011 |

(Continued)

OTHER PUBLICATIONS

Communication issued by the European Patent Office dated Sep. 22, 2017 in counterpart European Patent Application No. 15843210.4.

(Continued)

*Primary Examiner* — Roland J Casillas
(74) *Attorney, Agent, or Firm* — Sughrue Mion, PLLC

(57) ABSTRACT

A method of outputting content by a device includes obtaining attribute information about review content that is retrieved by the device; estimating an amount of user's memory about the review content at a preset time based on the obtained attribute information and reference information obtained after the review content is selected; comparing the estimated amount of the user's memory and a threshold value; and changing appearance of the review content in response to the amount of the user's memory being determined as equal to or less than the threshold value.

25 Claims, 22 Drawing Sheets

(56) References Cited

U.S. PATENT DOCUMENTS

2012/0129142 A1   5/2012  Yoon
2014/0244337 A1   8/2014  Terasawa

FOREIGN PATENT DOCUMENTS

KR   10-2012-0053657 A    5/2012
KR   10-2013-0042514 A    4/2013
KR   10-2013-0142290 A   12/2013
KR   10-2014-0045672 A    4/2014

OTHER PUBLICATIONS

International Search Report dated Jan. 18, 2016 issued by International Searching Authority in counterpart International Patent Application No. PCT/KR2015/009980 (PCT/ISA/210).
Written Opinion dated Jan. 18, 2016 issued by International Searching Authority in counterpart International Patent Application No. PCT/KR2015/009980 (PCT/ISA/237).

* cited by examiner

FIG. 18

| CONTENT | FIRST REFERENCE DATE AND TIME▼ | REFERENCE NUMBER OF TIMES | DIFFICULTY | IMPORTANCE | SECOND REFERENCE DATE AND TIME |
|---|---|---|---|---|---|
| MEMORIZED CONTENT1 | 14/6/2 13:00 | 1 | DIFFICULT | ★★★ | 14/6/4 11:00 |
| MEMORIZED CONTENT2 | 14/6/2 13:30 | 2 | EASY | ★★ | 14/6/5 10:00 |
| MEMORIZED CONTENT3 | 14/6/3 10:30 | 2 | NORMAL | ★★ | 14/6/5 09:00 |
| MEMORIZED CONTENT4 | 14/6/4 15:00 | 1 | EASY | ★ | 14/6/9 15:00 |
| MEMORIZED CONTENT5 | 14/6/4 16:00 | 3 | DIFFICULT | ★★ | 14/6/7 20:00 |
| ... | ... | ... | ... | ... | ... |

FIG. 19

| CONTENT | FIRST REFERENCE DATE AND TIME▼ | REFERENCE NUMBER OF TIMES | DIFFICULTY | IMPORTANCE | SECOND REFERENCE DATE AND TIME |
|---|---|---|---|---|---|
| MEMORIZED CONTENT1 | 14/6/2 13:00 | 1 | DIFFICULT | ★★★ | 14/6/4 11:00 |
| MEMORIZED CONTENT3 | 14/6/2 10:30 | 2 | NORMAL | ★★ | 14/6/5 09:00 |
| MEMORIZED CONTENT2 | 14/6/3 13:30 | 2 | EASY | ★★ | 14/6/5 10:00 |
| MEMORIZED CONTENT4 | 14/6/4 16:00 | 3 | DIFFICULT | ★ | 14/6/7 20:00 |
| MEMORIZED CONTENT5 | 14/6/4 15:00 | 1 | EASY | ★★ | 14/6/9 15:00 |
| ... | ... | ... | ... | ... | ... |

METHOD AND DEVICE FOR OUTPUTTING CONTENT AND RECORDING MEDIUM FOR EXECUTING THE METHOD

CROSS-REFERENCE TO RELATED APPLICATION

This application claims priority from Korean Patent Application No. 10-2014-0127690, filed on Sep. 24, 2014 in the Korean Intellectual Property Office, the disclosure of which is incorporated herein in its entirety by reference.

BACKGROUND

1. Field

Apparatuses and methods consistent with exemplary embodiments relate to outputting content storing a program that is executable by a computer to perform a method of outputting content.

2. Description of the Related Art

Terminals may be configured to perform various functions. Moreover, as the development of smart devices has accelerated, various applications have been developed and used.

In particular, interest into educational applications has recently increased. When providing users with educational content, smart devices may edit the educational content in accordance with users' purposes and may provide users with the edited educational content.

However, related art devices merely use a content editing method of extracting a part of educational content or combining different types of educational content and thus fail to substantially increase the learning efficiency of users using educational content.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a content output method capable of easily providing a user with information regarding specific content from among content displayable on a device by differentiating a method of outputting the specific content.

According to an aspect of an exemplary embodiment, there is provided a method of outputting content by a device including: obtaining attribute information about review content that is retrieved by the device; estimating an amount of user's memory about the review content at a preset time based on the obtained attribute information and reference information obtained after the review content is selected; comparing the estimated amount of the user's memory and a threshold value; and changing appearance of the review content in response to the amount of the user's memory being determined as equal to or less than the threshold value.

The estimated amount of the user's memory may correspond to an estimated capability of the user to memorize or recall the review content without referring to the review content.

The reference information may include information of a time when the review content is referred to through the device, and information of the number of times that the review content is referred to through the device.

The changing the appearance of the review content may include changing at least one of a transparency, a color, a form, a size, a layout, a font, a character style, and an arrangement order of the review content in response to the amount of the user's memory being determined as equal to or less than the threshold value.

The changing the appearance of the review content may include comparing the determined amount of user's memory and the threshold value; and determining a recommendation review time of the review content based on a result of the comparison. The appearance of the review content may be changed at the determined recommendation review time.

The method may further include obtaining information regarding a recommendation review time of a plurality of pieces of review content, the plurality of pieces of review content including the retrieved review content; and determining an arrangement order of the plurality of pieces of review content displayed at the obtained recommendation review time of the plurality of pieces of review content.

The method may further include determining an event schedule for the review content. The appearance of the review content may be changed in response to the event schedule being present within a preset time period.

The estimating the amount of the user's memory may include obtaining information regarding the user's memory that is determined by comparing preset average memory and the user's memory.

The obtaining the attribute information may include providing a user interface through which the attribute information is input. The attribute information may include a degree of importance and a degree of difficulty of the review content.

The method may further include detecting a user reference operation on the review content; changing a selection time when the review content is to be selected to a review time when the user reference operation is detected in response to the user reference operation being detected; increasing a reference number of times after the selection time is changed to the review time; and re-estimating the amount of the user's memory based on the changed review time and the increased reference number of times.

The method may further include determining a recommendation review time of the review content based on the re-estimated amount of the user's memory.

The method may further include displaying a plurality of pieces of review content and information regarding one or more parameters for determining an amount of the user's memory for each of the plurality of pieces of review content.

The method may further include displaying one or more pieces of review content from a plurality of pieces of content stored in the device and an amount of the user's memory for the one or more pieces of review content.

The method may further include extracting one or more pieces of review content provided with identification information from content displayed on the device.

According to an aspect of another exemplary embodiment, there is provided a non-transitory computer readable storage medium storing a computer program that is executable by a computer to perform the method.

According to an aspect of another exemplary embodiment, there is provided a device for outputting content including: an input unit configured to obtain attribute information about review content; a control unit configured to estimate an amount of user's memory about the review content at a preset time based on the obtained attribute information and reference information obtained after the review content is selected and compare the estimated amount of the user's memory and a threshold value; and an output unit configured to change appearance of the review content according to a result of comparing the estimated amount of user's memory and the threshold value.

The control unit may be further configured to determine whether the estimated amount of user's memory is equal to or less than the threshold value, and control the output unit to change at least one of a transparency, a color, a form, a size, a layout, a font, a character style, and an arrangement order of the review content in response to the estimated amount of the user's memory being equal to or less than the threshold value.

The control unit may be further configured to compare the estimated amount of the user's memory and the threshold value and determine a recommendation review time of the review content based on a result of the comparison. The output of the review content may be changed at the determined recommendation review time.

The control unit may be further configured to obtain information regarding a recommendation review time of a plurality of pieces of review content and determine an arrangement order of the plurality of pieces of review content displayed at the obtained recommendation review time of the plurality of pieces of review content.

The control unit may be further configured to determine an event schedule for the review content and control the output unit to change the appearance of the review content in response to the event schedule being present within a preset time period.

The control unit may be further configured to obtain information regarding the user's memory, compare preset average memory and the user's memory, and determine the information regarding the user's memory based on a result of the comparison.

The input unit may be further configured to provide a user interface through which the attribute information input. The attribute information may include a degree of importance and a degree of difficulty of the review content.

The device may further include a sensor configured to detect a user reference operation on the review content. The control unit may be further configured to change a selection time when the review content is selected to a review time when the user reference operation is detected in response to the reference operation being detected, increase a reference number of times after the selection time is changed to the review time, and re-estimate the amount of the user's memory based on the changed review time and the increased reference number of times.

The control unit may be further configured to determine a recommendation review time of the review content based on the re-estimated amount of the user's memory.

The output unit may be further configured to output content of a plurality of pieces of review content and content displaying information regarding one or more parameters for determining an amount of the user's memory for each of the plurality of pieces of review content.

The output unit may be further configured to display one or more pieces of review content of a plurality of pieces of content stored on the device and an amount of the user's memory for the one or more pieces of review content.

The control unit may be further configured to extract one or more pieces of review content provided with identification information from content displayed on the device.

According to an aspect of another exemplary embodiment, there is provided a method of displaying content by a device including: displaying content on a screen of the device; recognizing part of the content that is selected as review content at a time t1; measuring an elapsed time between the time t1 and a time t2; estimating a capability of a user to recall the review content without referring to the review content based on the elapsed time and a number of times that the review content has been referred to during the elapsed time; and displaying, at the time t2, the review content having different appearance than appearance of the review content displayed at the time t1 in response to the estimated capability of the user being equal to or less than a threshold value.

The estimating may include estimating the capability of the user to recall the review content based on the elapsed time, the number of times, and a time duration during which the review content is displayed through the device.

The threshold value may correspond to a predetermined percentage of a maximum memory capability.

The review content displayed at the time t2 may have a readability lower than a readability of the review content displayed at the time t1.

BRIEF DESCRIPTION OF THE DRAWINGS

The above and/or other aspects will be more apparent by describing certain exemplary embodiments, with reference to the accompanying drawings, in which:

FIGS. 18 and 19 are tables illustrating results obtained when a device outputs parameters for determining an amount of user's memory for review content based on a preset basis and information regarding the amount of user's memory for the review content;

DETAILED DESCRIPTION

Figure 1:
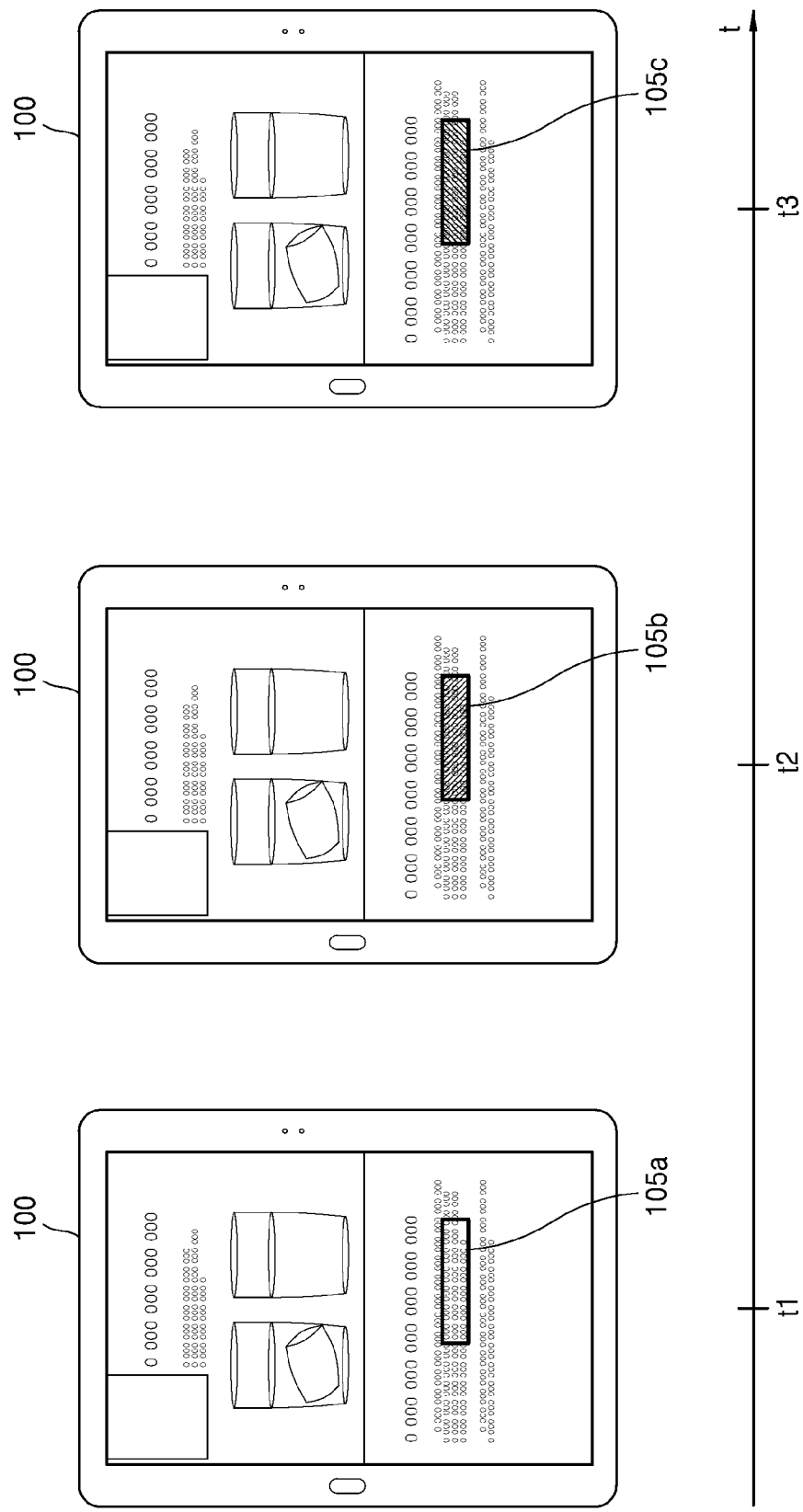
FIG. 1 is a conceptual diagram for describing a method used by a device to output content according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "connected" to another element, it may be directly connected to the other element or may be electrically connected to the other element with other element(s) interposed therebetween. It will also be understood that the terms "comprises", "includes", and "has", when used herein, specify the presence of stated elements, but do not preclude the presence or addition of other elements, unless otherwise defined.

Hereinafter, exemplary embodiments will be described in detail with reference to the accompanying drawings.

FIG. 1 is a conceptual diagram for describing a method used by a device 100 to output content according to an exemplary embodiment.

Referring to FIG. 1, the device 100 may output review content 105a, 105b, and 105c (hereinafter referred to as review content 105) which varies according to time. The review content 105 may correspond to content which is displayed on the device 100 and is determined as a target through a user input. For example, when the device 100 operates a digital book application, the review content 105 may include text, images, and videos selected as targets that are to be memorized by the user among content included in a digital book. The review content 105 may be selected by a user input. In this regard, the user input may include a touch input, a hovering input, and an input of a selection operation using an input tool. The review content 105 may be selected by an identifier that the user displays in content output by the device 100. Although FIG. 1 illustrates the review content 105 as part of the entire content displayed on the device 100, the present exemplary embodiment is not limited thereto, and the review content 105 may correspond to the entire content.

The device 100 may store information regarding a selection time t1 indicating a time when the review content 105 is selected. For example, the device 100 may store a time when a user input for the review content 105 is obtained or a time when the identifier for the review content 105 is displayed as the information regarding the selection time t1.

The device 100 may store attribute information indicating a degree of importance and difficulty of the review content 105. The degree of importance of the review content 105 may indicate whether the review content 105 includes the core of the entire content and necessity that the review content 105 is to be memorized by the user in connection with an event such as a test. The degree of difficulty of the review content 105 may be determined according to complexity of the review content 105, whether the review content 105 is new to the user, or whether the review content 105 is about a subject the user is weak in.

The device 100 may obtain information regarding user's memory. The information regarding the user's memory may indicate a level of a user's ability of memorizing the review content 105 in determining an amount of the user's memory regarding the review content 105. The amount of the user's memory may refer to the capability of the user to memorize or recall the review content 105. The device 100 may store reference information including a reference number of times and a reference time from a time when the review content 105 is selected to a preset time. The reference number of times may refer to the number of times that the review content 105 has been referred by the user. The reference time may refer to a point in time at which the review content 105 is displayed or reproduced through the device 100. If the review content 105 is an audio file, the reference time may correspond to the time when the audio file is played.

The device 100 may change the output of the review content 105. When the review content 105 is selected from among the entire content that may be output, the device 100 may change only an output form of the review content 105 according to a setting to allow the user to recognize the review content 105. For example, the device 100 may change the output of the review content 105 according to a time change. According to an exemplary embodiment, the device 100 may change the output of the review content 105 according to a change in the amount of the user's memory regarding the review content 105 determined according to the time change. The amount of the user's memory may be determined according to parameters for determining the amount of user's memory such as the attribute information of the review content 105, the information regarding the user's memory, and the reference information of the review content 105. The amount of the user's memory determined according to the parameters for determining the amount of user's memory will be described in detail with reference to FIGS. 3 through 6 later.

The device 100 may change the output of the review content 105 according to the change in the amount of the user's memory regarding the review content 105. The amount of the user's memory may change over time. For example, referring to FIG. 1, the amount of the user's memory regarding the review content 105 may be different at times t1, t2, and t3. The device 100 may differently change the first time review content 105a output at the time t1, the second time review content 105b output at the time t2, and the third time review content 105c output at the time t3. In this regard, the time t1 may be a time when the review content 105 is selected, and the times t2 and t3 may be points in time at which the amount of the user's memory for the review content 105 is smaller than a threshold value over time. According to another exemplary embodiment, the device 100 may identify a type of the review content 105 such as text, an image, and a video to change the output form of the review content 105. This will be described in detail with reference to FIG. 2 later.

The device 100 may collect and analyze information regarding all review content (e.g., the review content 105) stored in a database. For example, the device 100 may display all review content (e.g., the review content 105) stored in the database in a descending order of importance.

The device 100 may obtain information regarding review content selected by another user via communication with another device.

Figure 2:
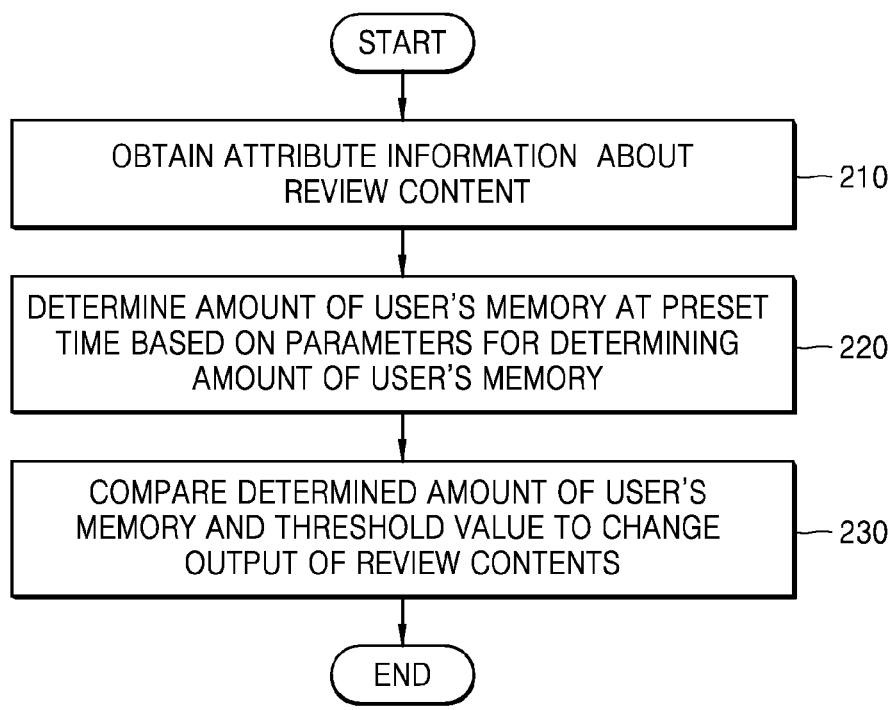
FIG. 2 is a flowchart of a method used by a device to output content according to an exemplary embodiment.

FIG. 2 is a flowchart of a method used by the device 100 to output content according to an exemplary embodiment.

In operation S210, the device 100 may obtain attribute information of review content. The device 100 may include the attribute information including information regarding importance and difficulty of the review content 105. For example, the information regarding the importance and the difficulty of the review content 105 may be determined by a user setting. As another example, the information regarding the importance and the difficulty of the review content 105 may be determined based on preset information regarding the review content 105 included in a database of the device 100. As another example, the information regarding the importance and the difficulty of the review content 105 may be determined based on information regarding importance and difficulty of the review content 105 as set by users of other devices.

In operation S220, the device 100 may determine an amount R of user's memory at a preset time based on parameters for determining the amount of user's memory including the obtained attribute information, reference information after a time when the review content 105 is selected, and information regarding the user's memory.

The reference information may include reference number of times and a reference time of the review content 105 after the review content 105 is selected. When a user input for the review content 105 is detected after the review content 105 is selected, the device 100 may determine that a user has referred to the review content 105. For example, when a user touch input for the review content 1015 is detected, the device 100 may determine that the user has referred to the review content 105. As another example, the device 100 may detect through a sensor that the user's eyes gaze at the review content 105 and determine that the user has referred to the review content 105.

The information regarding the user's memory may be obtained from external data that stores bio information such as user's brain waves. The device 100 may obtain the information regarding the user's memory from an application that may infer the information regarding the user's memory. The application may include a game application or a learning application that may infer the user's memory. As another example, the device 100 may obtain the information regarding the user's memory based on a number of times that the user has repeatedly referred to content. For example, the device 100 may obtain the information regarding the user's memory based on the number of times that the user has referred to a memo stored on the device 100. The information obtained according to the exemplary embodiment may be standardized with respect to a preset average memory value stored in the database of the device 100.

The device 100 may determine the amount R of user's memory for the review content 105 based on the attribute information, the reference information, and the parameters for determining the amount of user's memory including the information regarding the user's memory according to Equation 1 below.

$$R = \frac{1}{I} e^{-D\left(\frac{t-t_0}{c}\right)^2} \qquad \text{[Equation 1]}$$

In Equation 1, R denotes the amount of user's memory, I denotes the importance of the review content 105, D denotes the difficulty of the review content 105, c denotes the reference number of times of the review content 105, t0 denotes a reference time when the review content 105 is referred to, e denotes the information regarding the user's memory, and t denotes a time.

According to an exemplary embodiment, the higher the importance, the greater the value of I, and the higher the difficulty, the greater the value of D. The greater the reference number of times, the greater the value of C. Meanwhile, the greater the amount of the user's memory, the smaller the value of e. However, this is merely an exemplary embodiment. Input forms of the parameters for determining the amount of user's memory may vary according to Equation 1 above. The smaller the amount R of user's memory determined by the device 100, the higher the difficulty and the importance of the review content 105. The greater the amount R of user's memory, the better the user's memory. The greater the amount R of user's memory, the greater the reference number of times. However, this is merely an exemplary embodiment. The amount R of user's memory regarding the review content 105 may be calculated according to various types of equations based on the parameters for determining the amount R of user's memory reflecting these characteristics.

The device 100 may input current time information or preset time information as a value of the time t. The device 100 may set a preset threshold value for the amount R of user's memory and predict the time t when the amount R of user's memory arrives at the threshold value.

In operation S230, the device 100 may compare the determined amount R of user's memory and the threshold value to change output of the review content 105.

According to an exemplary embodiment, the device 100 may change appearance of the review content without changing the substance of the review content. The appearance of the review content may correspond to at least one of a size, a color, a form, a layout, a font, a character style (e.g., bold, italic, or underlined), an arrangement order, and a transparency of the review content 105. However, this is merely an exemplary embodiment. A method of changing an output form of the device 100 is not limited thereto. As another example, the device 100 may differently change only an output time of the review content 105 among all content, thereby changing the output of the review content 105.

According to another exemplary embodiment, the device 100 may identify a type of the review content 105 such as text, an image, and a video to change the output form thereof. If the review content 105 is a video, since the review content 105 may include not only visual information but also auditory information, the device 100 may change an output of the auditory information included in the review content 105. For example, the device 100 may turn down or block sound.

A relationship between the amount R of user's memory regarding the review content 105 and the parameters for determining the amount R of user's memory will now be described in detail with reference to FIGS. 3 through 6 below.

Figure 3:
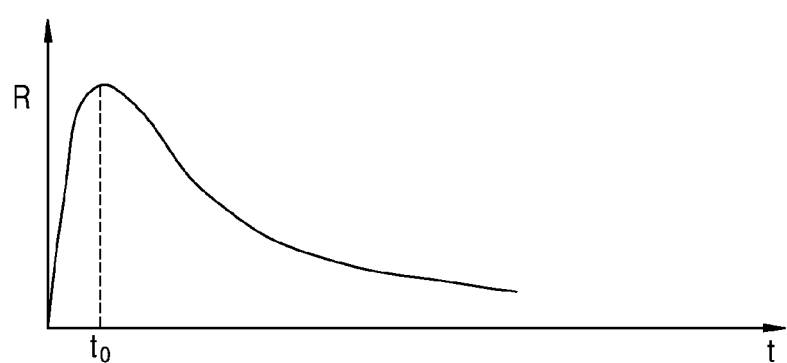
FIG. 3 is a graph of an amount of user's memory regarding changing of review content based on a reference time according to an exemplary embodiment.

FIG. 3 is a graph of the amount R of user's memory regarding the review content 105 changing based on a reference time t0 according to an exemplary embodiment.

The amount R of user's memory may be reduced as time goes by after the review content 105 is selected and may be renewed at the reference time t0. The amount R of user's memory regarding the review content 105 at the reference time t0 may be determined by inputting information regarding the reference time t0 at the time t of Equation 1 described above. For example, the amount R of user's memory regarding the review content 105 at the reference time t0 may be determined as 1/I. The amount R of user's memory regarding the review content 105 may be reduced with respect to the reference time t0.

Meanwhile, when a user refers to the review content 105, a value of the reference number of times c of Equation 1 may increase. For example, an initial value of the reference number of times c may be set as 1, and, whenever the user refers to the review content 105, the reference number of times c may increase by 1 from the initial value of 1.

Figure 4A:
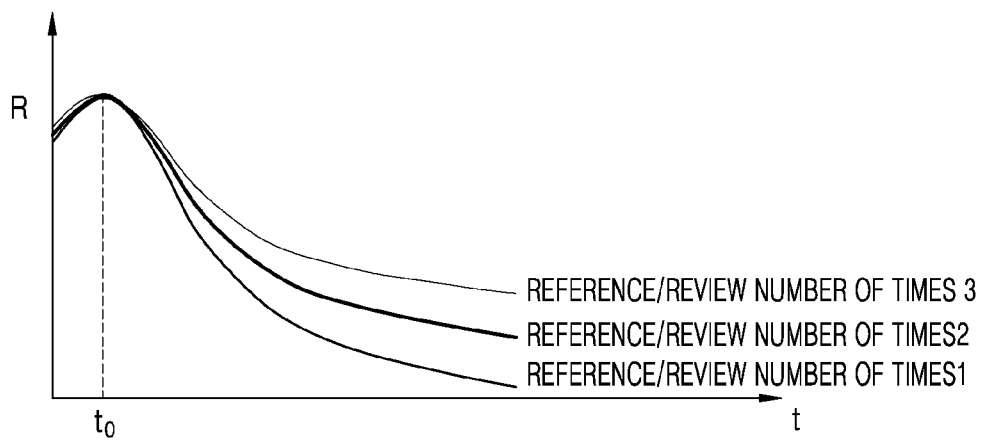
FIGS. 4A and 4B are graphs of an amount of user's memory regarding changing of review content based on a reference number of times according to an exemplary embodiment.
Figure 4B:
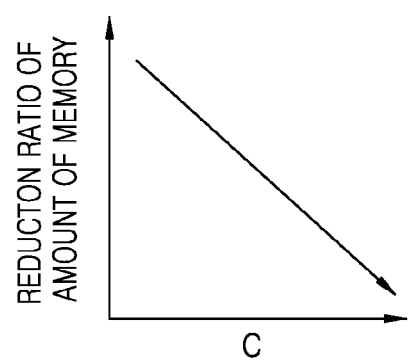

FIGS. 4A and 4B are graphs of the amount R of user's memory regarding changing of the review content 105 based on the reference number of times c according to an exemplary embodiment.

FIG. 4A shows that the greater the reference number of times c when a user refers to the review content 105, the greater the amount R of user's memory at a time after a predetermined period of time from the reference time t0. For example, upon comparing the amount R of user's memory when the reference number of times c is 1, 2, and 3, the amount R of user's memory regarding the review content 105 may be the greatest when the reference number of times c is 3.

FIG. 4B shows a relationship between the reference number of times c when the user refers to the review content 105 and a reduction ratio of the amount R of user's memory. The greater the reference number of times c, the lower the reduction ratio of the amount R of user's memory.

Referring to Equation 1 above, when the user refers to the review content 105, the reference number of times c may increase by 1. For example, whenever the review content 105 is displayed or reproduced by the device 100, the reference number of times c may increase by 1 from an initial value of 1.

Figure 5A:
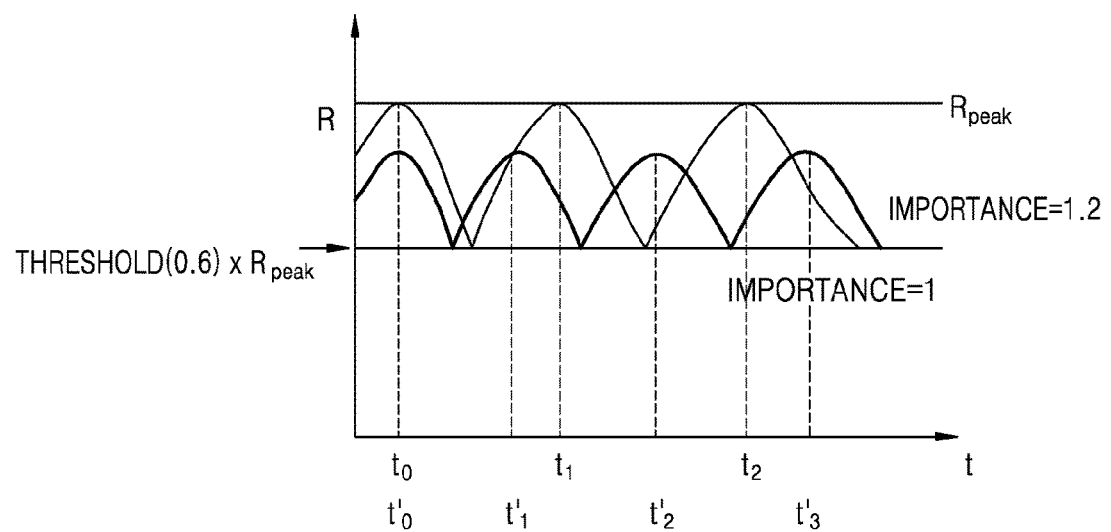
FIGS. 5A and 5B are graphs of an amount of user's memory regarding changing of review content based on the importance of the review content according to an exemplary embodiment.
Figure 5B:
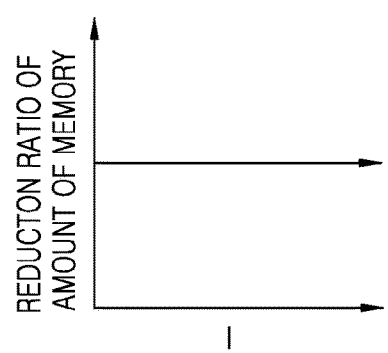

FIGS. 5A and 5B are graphs of the amount R of user's memory regarding the review content 105 changing based on the importance I of the review content 105 according to an exemplary embodiment.

FIG. 5A shows that the higher the importance I of the review content 105, the smaller the amount R of user's memory. The amount R of user's memory for the review content 105 at reference times t'0, t'1, and t'2 when the importance I is 1.2 may be greater than amount R of user's memory for the review content 105 at the reference times t0, t1, and t2 when the importance I is 1.0. The higher the importance I, the smaller the amount R of user's memory for the review content 105, and thus time for the amount R of user's memory to reach a threshold value may be also reduced.

Meanwhile, the importance I of the review content 105 may not influence a reduction ratio of the amount R of user's memory. FIG. 5B shows that although the importance I of the review content 105 increases, the reduction ratio of the amount R of user's memory does not change. However, the higher the importance I of the review content 105, the smaller the amount R of user's memory for the review content 105 at a time when the review content 105 is initially selected, and thus, a time for the amount R of user's memory to reach the threshold value may be also reduced.

Figure 6A:
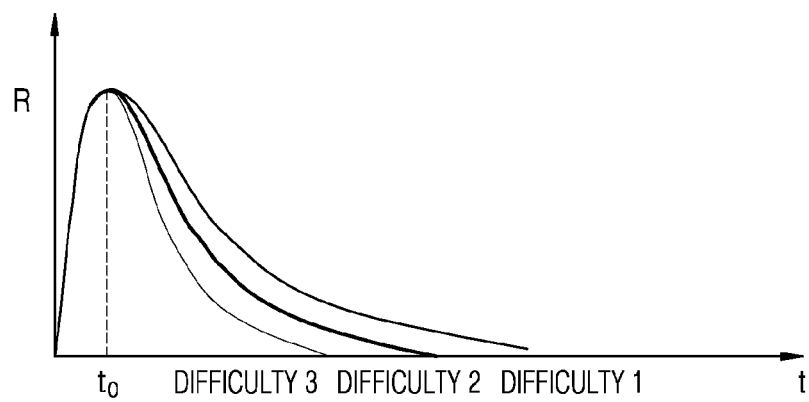
FIGS. 6A and 6B are graphs of an amount of user's memory regarding changing of review content based on the difficulty of the review content according to an exemplary embodiment.
Figure 6B:
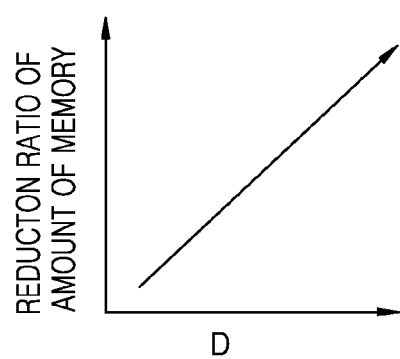

FIGS. 6A and 6B are graphs of the amount R of user's memory regarding changing of the review content 105 based on the difficulty D thereof according to an exemplary embodiment.

FIG. 6A shows that the higher the difficulty D of the review content 105, the smaller the amount R of user's memory regarding the review content 105. For example, upon comparing the amount R of user's memory when the difficulty D is 3, 2, and 1, the amount R of user's memory regarding the review content 105 may be the greatest when the difficulty D is 1.

FIG. 6B shows a relationship between the difficulty D of the review content 105 and a reduction ratio of the amount R of user's memory. The higher the difficulty D, the higher the reduction ratio of the amount R of user's memory.

Figure 7A:
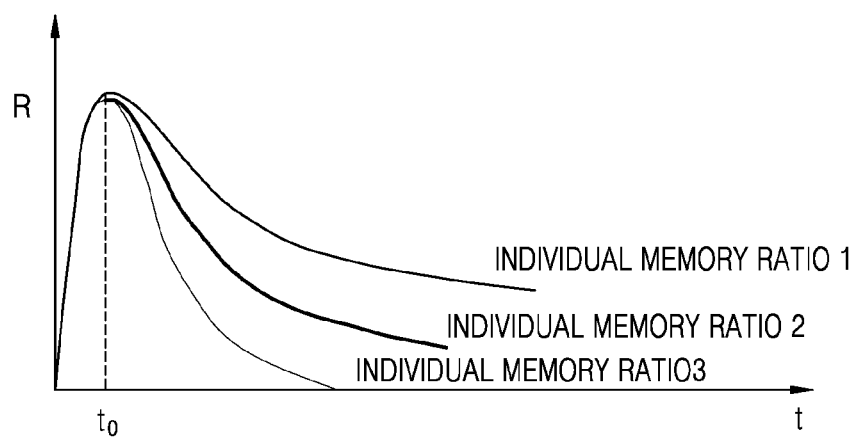
FIGS. 7A and 7B are graphs of an amount of user's memory regarding changing of review content based on information regarding the user's memory according to an exemplary embodiment.
Figure 7B:
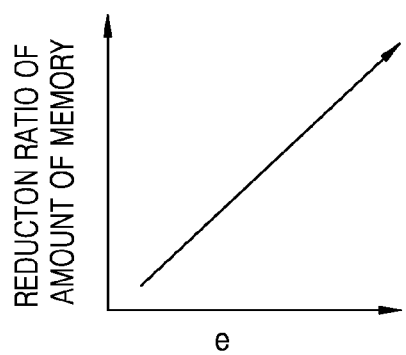

FIGS. 7A and 7B are graphs of the amount R of user's memory regarding the review content 105 changing based on the information e regarding the user's memory according to an exemplary embodiment.

FIG. 7A shows that the higher the user's memory for the review content 105, the greater the amount R of user's memory. Among individual memory ratios of 1, 2, and 3, the user's memory has the highest value when the individual memory ratio is 1. In the case where the individual memory ratio is assumed as 3, a user's individual memory ratio has a value equal to or greater than 3 when the user's memory is lower than an average value, and, the user's individual memory ratio has a value equal to or smaller than 3 when the user's memory is higher than the average value. However, this is merely an exemplary embodiment. The individual memory ratio may be set in various ways according to a setting of a device.

FIG. 7B shows a relationship between the individual memory ratio e and a reduction ratio of the amount R of user's memory. The higher the individual memory ratio e, the higher the reduction ratio of the amount R of user's memory. In this regard, the higher the individual memory ratio e, the lower the user's memory.

Figure 8:
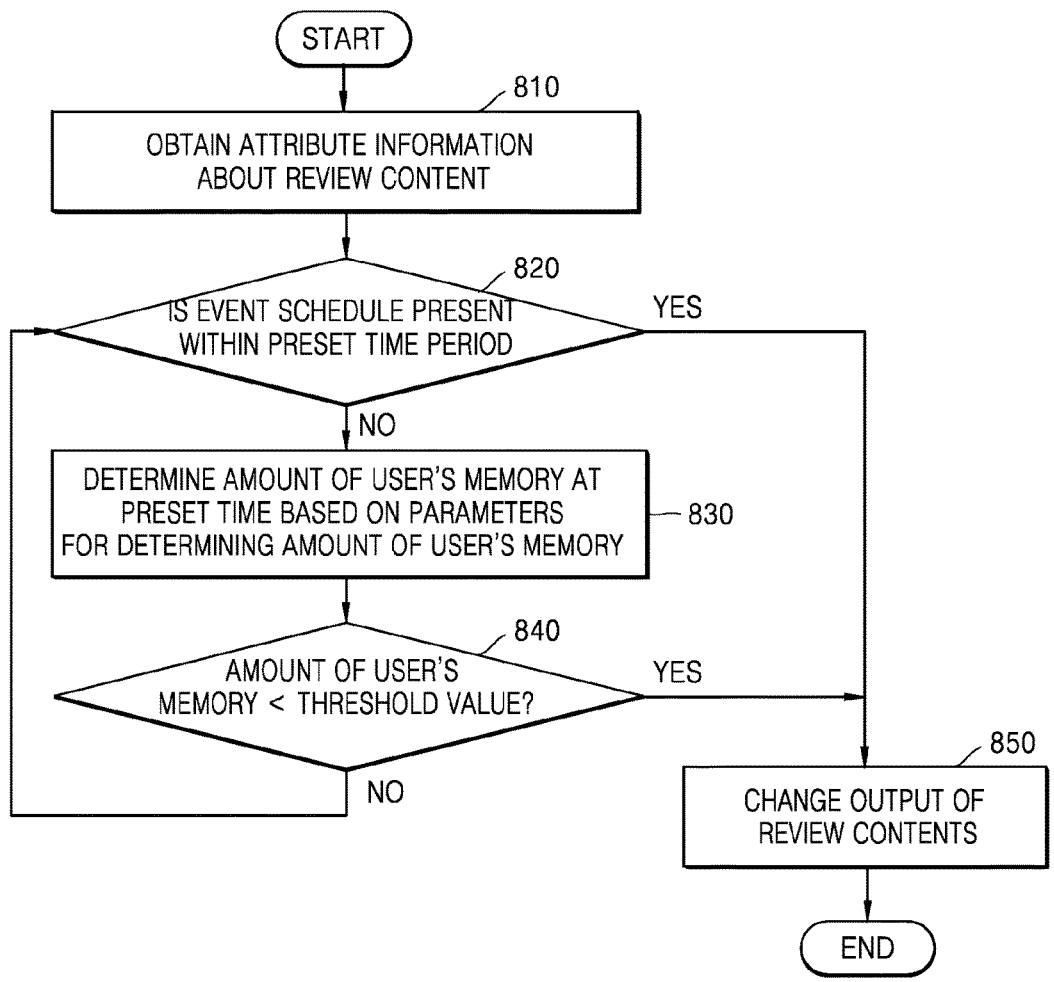
FIG. 8 is a flowchart of a method used by a device to output content when an event occurs according to an exemplary embodiment.

FIG. 8 is a flowchart of a method in which the device 100 outputs content when an event occurs according to an exemplary embodiment.

In operation S810, the device 100 may obtain attribute information of the review content 105. The device 100 may store the attribute information indicating a degree of importance and a degree of difficulty of the review content 105.

Meanwhile, operation S820 may correspond to operation S210 described with reference to FIG. 2 above.

In operation S820, the device 100 may determine whether an event schedule is present within a preset time range. The event may include all events that a user needs to refer to in relation to the review content 105. For example, the event may include a test and a class regarding the review content 105.

When the event that the user needs to refer to the review content 105 is present, the device 100 may store information regarding the event schedule. The device 100 may obtain information regarding the event by referring to information recorded on an application. For example, the device 100 may extract and store event information relating to the review content 105 from a schedule application and a calendar application. When a record regarding a natural science test is stored at a specific date of the calendar application, and a title of content including the review content 105 is natural science, the device 100 may store the specific date when the natural science test is scheduled as the event schedule. However, this is merely an exemplary embodiment and the exemplary embodiment is not limited thereto.

In operation S830, the device 100 may determine the amount R of user's memory at a preset time based on parameters for determining the amount R of user's memory including the obtained attribute information, reference information after a time when the review content 105 is selected, and information regarding the user's memory. When the event schedule is not present until the preset time, the device 100 may determine the amount R of user's memory for the review content 105 based on the parameters for determining the amount R of user's memory.

Meanwhile, operation S830 may correspond to operation S220 described with reference to FIG. 2 above.

In operation S840, the device 100 may determine whether the determined amount R of user's memory is equal to or smaller than a threshold value. In this regard, the threshold value may be a basis indicating whether the user may recall the review content 105 without referring to the review content 105.

When the determined amount R of user's memory is equal to or greater than the threshold value, the device 100 may determine whether the event schedule is present within the preset time period. When the determined amount R of user's memory is equal to or greater than the threshold value, the device 100 may repeatedly perform operations S820 through S840.

In operation S850, the device 100 may change output of the review content 105. When the event schedule is present within the preset time period or the determined amount R of user's memory is equal to or smaller than the threshold value, the device 100 may change the output of the review content 105.

When the device 100 changes the output of the review content 105, the user may recognize that the amount R of user's memory for the review content 105 is equal to or smaller than the threshold value and may review the review content 105.

Figure 9:
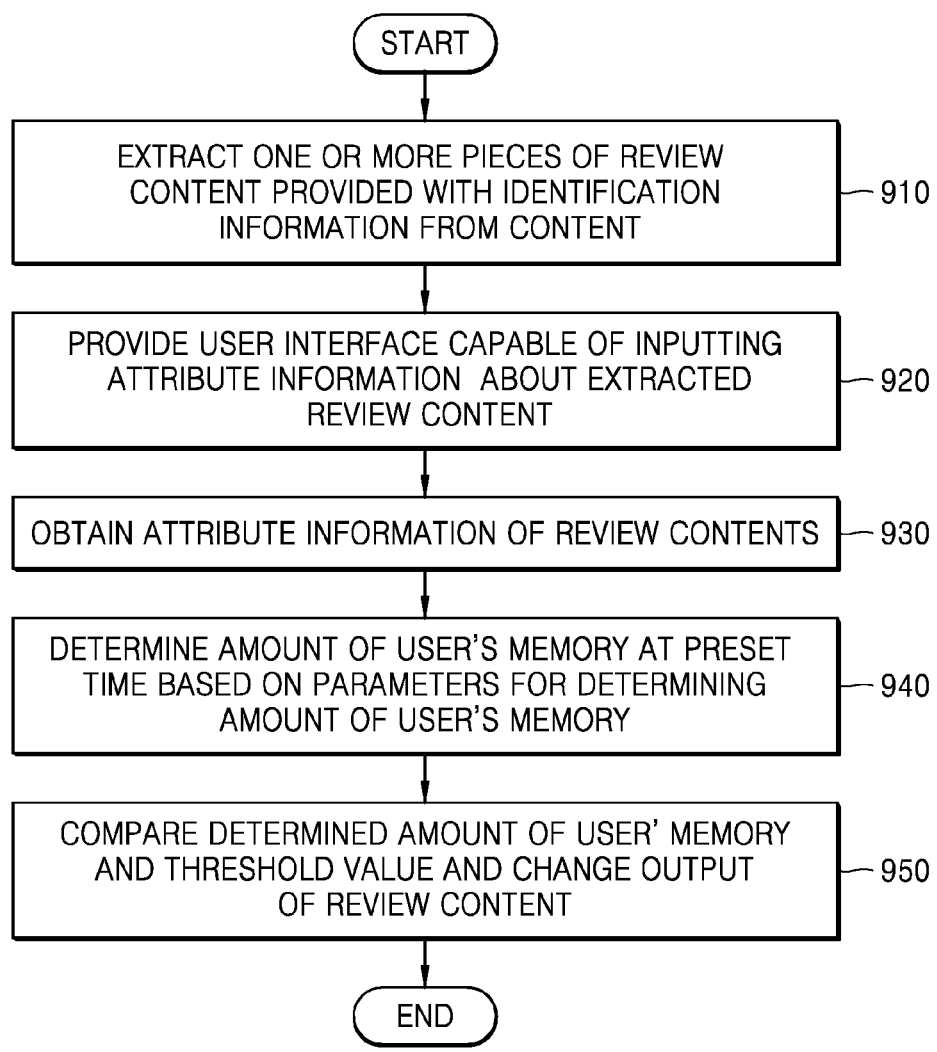
FIG. 9 is a flowchart of a method used by a device to extract review content and provides a user interface capable of inputting attribute information about the extracted review content according to an exemplary embodiment.

FIG. 9 is a flowchart of a method used by the device 100 to extract review content and provide a user interface capable of inputting attribute information of the extracted review content according to an exemplary embodiment.

In operation S910, the device 100 may extract one or more pieces of review content (e.g., review content 105) provided with identification information from content. The device 100 may determine some pieces of the content provided with the identification information as the review content (e.g., review content 105).

Figure 10:
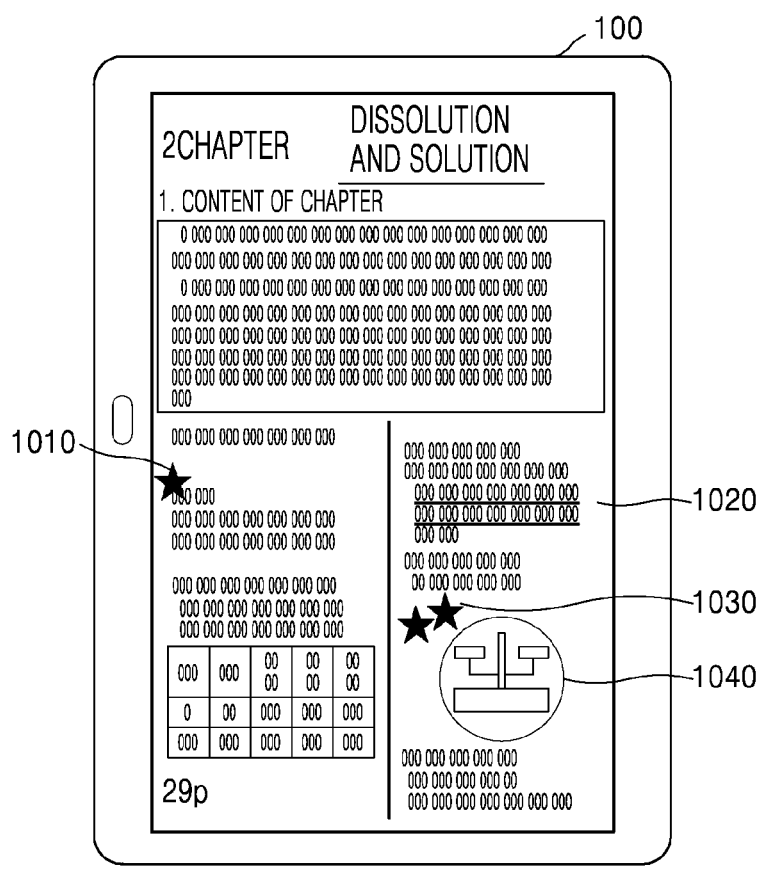
FIG. 10 is a diagram for describing a method used by a device to determine review content based on identification information provided with the review content.

For example, as shown in FIG. 10, the device 100 may determine content located in a region providing identification information 1010, 1020, 1030, and 1040 as the review content (e.g., review content 105) based on the identification information. The identification information may have various shapes. For example, the identification information may include diagrams such as polygonal shapes, lines, and points or an emphasis indication using a highlight.

As another example, the device 100 may determine a category of the review content (e.g., review content 105) according to types of the identification information 1010, 1020, 1030, and 1040. A method in which the device 100 determines the category of the review content (e.g., review content 105) according to the types of the identification information 1010, 1020, 1030, and 1040 will be described in detail with reference to FIG. 10 later.

In operation S920, the device 100 may provide the user interface through which the attribute information of the extracted one or more pieces of the review content (e.g., review content 105) may be inputted into the device 100. The device 100 may provide the user interface for obtaining the attribute information including importance and difficulty of the one or more pieces of the review content (e.g., review content 105). For example, the device 100 may provide a popup window capable of inputting the attribute information. A method in which the device 100 provides the user interface for obtaining the attribute information will be described in detail with reference to FIG. 11 below.

Figure 11:
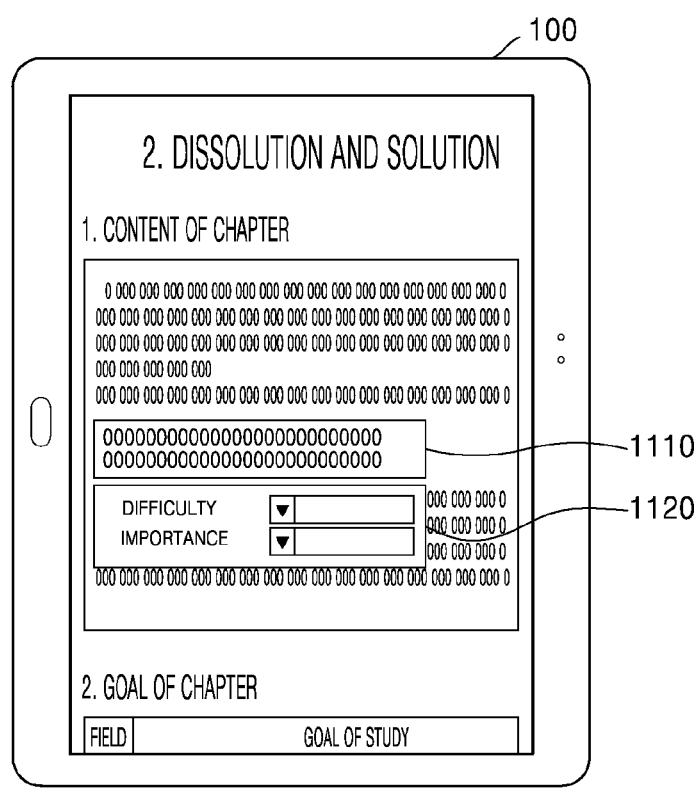
FIG. 11 is a diagram for describing a method used by a device to provide a user interface for obtaining attribute information of review content according to an exemplary embodiment.

FIG. 11 is a diagram for describing a method used by the device 100 to provide a user interface for obtaining attribute information of review content 1110 according to an exemplary embodiment.

Referring to FIG. 11, the device 100 may provide a popup window 1120 capable of inputting the attribute information of the review content 1110 within a preset range from the extracted review content 1110. The popup window 1120 may include an input window capable of inputting difficulty and importance.

A user may input information regarding the difficulty and the importance into the popup window 1120. When the device 100 obtains the information regarding the difficulty and the importance from the user, the device 100 may store the obtained information regarding the difficulty and the importance in a database as the attribute information of the review content 1110.

Meanwhile, the popup window capable of inputting the attribute information shown in FIG. 11 is merely an example of a user interface that may be provided by the device 100. The exemplary embodiment is not limited thereto.

In operation S930, the device 100 may obtain the attribute information of the one or more pieces of the review content (e.g., 105). The device 100 may store the attribute information obtained through the user interface.

Meanwhile, operation S930 may correspond to operation S210 described with reference to FIG. 2 above.

In operation S940, the device 100 may determine the amount R of user's memory at a preset time based on parameters for determining the amount R of user's memory. The smaller the amount R of user's memory determined by the device 100, the higher the difficulty and the importance of the review content 105. The greater the amount R of user's memory, the better the user's memory. The greater the amount R of user's memory, the greater the reference number of times. The amount R of user's memory may be reduced over time. The amount R of user's memory regarding the review content 105 may be calculated according to various types of equations based on the parameters for determining the amount R of user's memory reflecting these characteristics.

Meanwhile, operation S940 may correspond to operation S220 described with reference to FIG. 2 above.

In operation S950, the device 100 may compare the determined amount R of user' memory and a threshold value and change output of the one or more pieces of the review content (e.g., review content 105). According to an exemplary embodiment, the device 100 may change at least one of a size, a color, form, a layout, a font, a character style (e.g., bold, italic, or underlined), an arrangement order, and a transparency of the review content 105. According to another exemplary embodiment, the device 100 may determine a type of the review content 105 such as text, an image and a video and change the output form of the review content 105.

Meanwhile, operation S950 may correspond to operation S230 described with reference to FIG. 2 above.

FIG. 10 is a diagram for describing a method in which the device 100 determines review content (e.g., review content 105) based on the identification information 1010, 1020, 1030, and 1040 provided with content.

Referring to FIG. 10, content studied by a user may be displayed on the device 100. The device 100 may recognize the identification information 1010, 1020, 1030, and 1040 provided with the content.

The device 100 may determine the content located in a region providing the identification information 1010, 1020, 1030, and 1040 as the review content (e.g., review content 105). The identification information may have various shapes. For example, the identification information may include diagrams such as polygonal shapes, lines, and points and may also include an emphasis indication using a highlight.

As another example, the device 100 may determine a category of the review content (e.g., review content 105) according to types of the identification information 1010, 1020, 1030, and 1040. For example, the device 100 may differently set types of events according to the types of the identification information 1010, 1020, 1030, and 1040. For example, in the case of first review content that displays the identification information 1010 and 1030 marked with a star, the device 100 may determine whether a first event occurs and may change a type of output as described with reference to FIG. 8. In the case of second review content that displays the identification information 1020 and 1040 marked with a line, the device 100 may determine whether a second event occurs and may change the type of output form as described with reference to FIG. 8.

However, this is merely an exemplary embodiment. When it is necessary to identify the review content (e.g., review content 105) in addition to the above-described embodiment, the user may display the review content (e.g., review content 105) by differentiating the identification information 1010, 1020, 1030, and 1040. For example, the device 100 may obtain information regarding the difficulty and the importance of the review content (e.g., review content 105) based on the identification information 1010, 1020, 1030, and 1040. For example, in the case of the identification information 1010 and 1030 marked with a star, the device 100 may identify the difficulty or the importance according to a number of stars.

Figure 12:
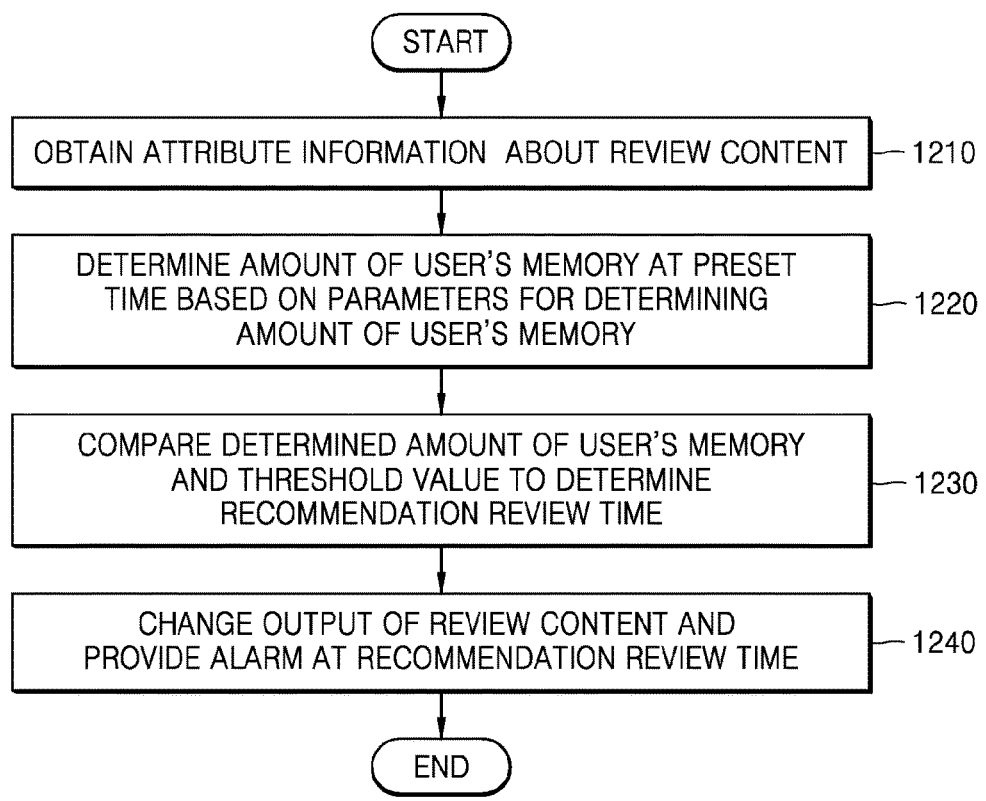
FIG. 12 is a flowchart of a method used by a device to provide information regarding a recommendation review time based on information regarding an amount of user's memory for review content according to an exemplary embodiment.

FIG. 12 is a flowchart of a method used by the device 100 to provide information regarding a recommendation review time based on information regarding the amount R of user's memory for the review content 105 according to an exemplary embodiment.

In operation S1210, the device 100 may obtain attribute information of the review content 105. The device 100 may store the attribute information including information regarding the importance and the difficulty of the review content 105.

Meanwhile, operation S1210 may correspond to operation S210 described with reference to FIG. 2 above.

In operation S1220, the device 100 may determine the amount R of user's memory at a preset time based on parameters for determining the amount of user's memory. The smaller the amount R of user's memory determined by the device 100, the higher the difficulty and the importance of the review content 105. The greater the amount R of user's memory, the better the user's memory. The greater the amount R of user's memory, the greater the reference number of times. The amount R of user's memory may be reduced over time. The amount R of user's memory regarding the review content 105 may be calculated according to various types of equations based on the parameters for determining the amount R of user's memory reflecting these characteristics.

Meanwhile, operation S1220 may correspond to operation S220 described with reference to FIG. 2 above.

In operation S1230, the device 100 may compare the determined amount R of user' memory and a threshold value and change the recommendation review time of the review content 105. When the amount R of user' memory is equal to or greater than the threshold value, the device 100 may calculate a time when the amount R of user' memory for the review content 105 is equal to or smaller than the threshold value. The device 100 may determine the time when the amount R of user' memory for the review content 105 is equal to or smaller than the threshold value as the recommendation review time. According to an exemplary embodiment, the device 100 may set the amount R of user' memory as the threshold value and may obtain information regarding the time t when the amount R of user' memory reaches at the threshold value based on Equation 1 described above.

In operation S1240, the device 100 may change output of the review content 105 at the recommendation review time and may provide an alarm indicating that the amount R of user' memory reaches at the recommendation review time.

According to an exemplary embodiment, the device 100 may change at least one of a size, a color, a form, a layout, a font, a character style (e.g., bold, italic, or underlined), an arrangement order, and a transparency of the review content 105. According to another exemplary embodiment, the device 100 may determine a type of the review content 105 such as text, an image, and a video and change an output form of the review content 105. Meanwhile, a method in which the device 100 changes the output form of the review content 105 is the same as described with reference to FIG. 2 above.

Meanwhile, the device 100 may provide a user with the alarm indicating that the amount R of user' memory reaches the recommendation review time by using vibration or sound. However, this is merely an exemplary embodiment. The device 100 may provide the user with the alarm indicating that the amount R of user' memory reaches the recommendation review time by limiting the output of the review content 105 on a regular basis to allow the user to recognize that the review content 105 flickers while being displayed.

Figure 13:
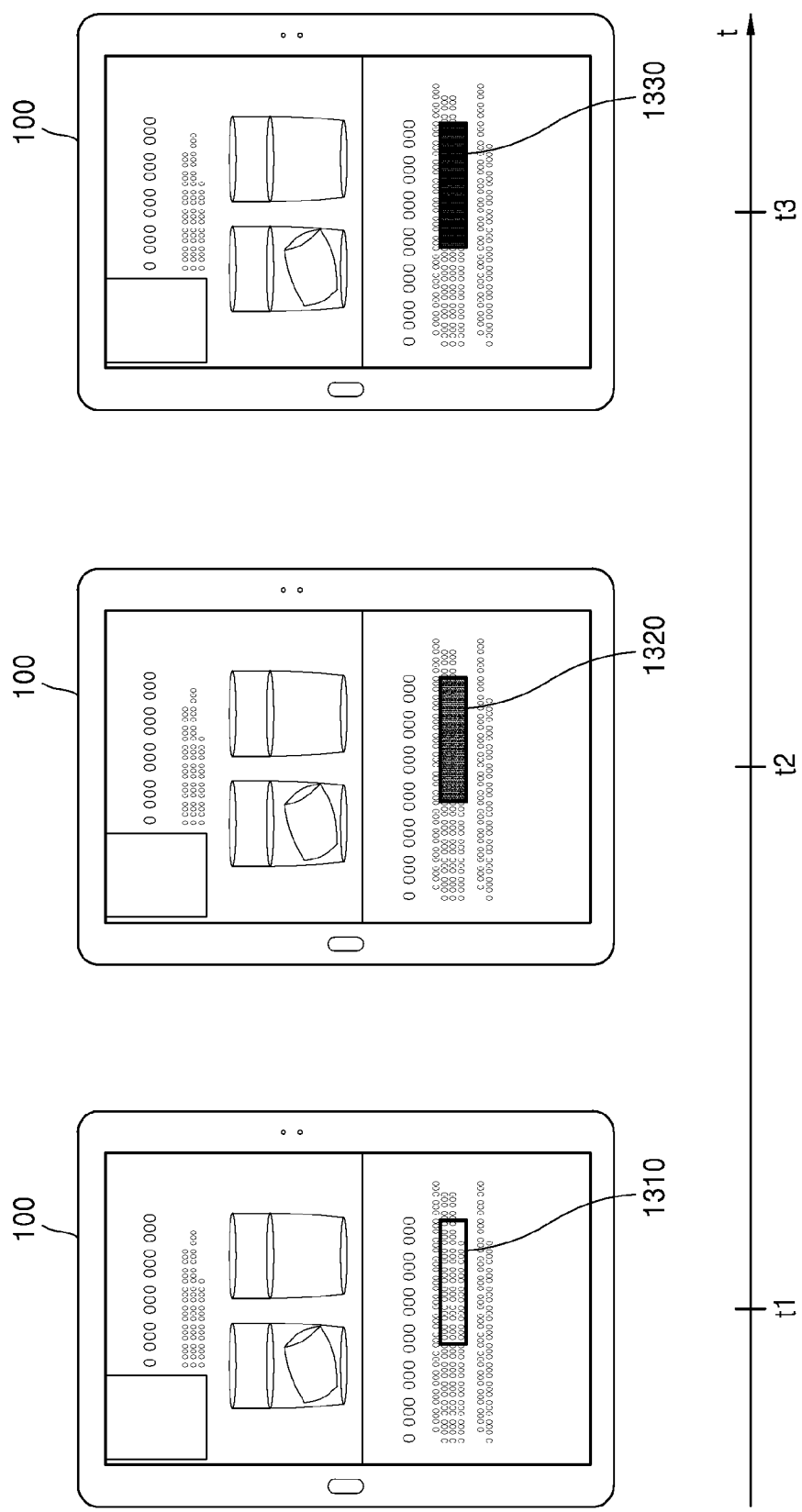
FIG. 13 is a diagram for describing a method used by a device to change a transparency of review content based on a change in an amount of user's memory according to an exemplary embodiment.

FIG. 13 is a diagram for describing a method in which the device 100 changes a transparency of review content 1310, 1320, and 1330 based on a change in an amount of user's memory according to an exemplary embodiment.

The amount of user's memory may change over time. For example, referring to FIG. 13, the amount of user's memory for the review content 1310, 1320, and 1330 may be different at the times t1, t2, and t3. The device 100 may differently set transparency levels of the first time review content 1310 that is review content output at the time t1, the second time review content 1320 that is review content output at the time t2, and the third time review content 1330 that is review content output at the time t3. The time t1 may be a time when the review content 1310 is selected, the time t2 may be a time when the amount of user's memory for the review content 1320 is equal to or smaller than a first threshold value, and the time t3 may be a time when the amount of user's memory for the review content 1330 is equal to or smaller than a second threshold value over time.

The device 100 may decrease the transparency levels of the review content 1310, 1320, and 1330 at the times t1, t2, and t3 over time so that the review content 1330 displayed at the time t3 becomes opaque. In this regard, it is assumed that a user reference operation on the review content 1310, 1320, and 1330 is not detected from the time t1 to the time t3. The device 100 may induce a user to refer to the review content 1310, 1320, and 1330 by changing the transparency thereof to be opaque according to a reduction in the amount of user's memory.

Figure 14:
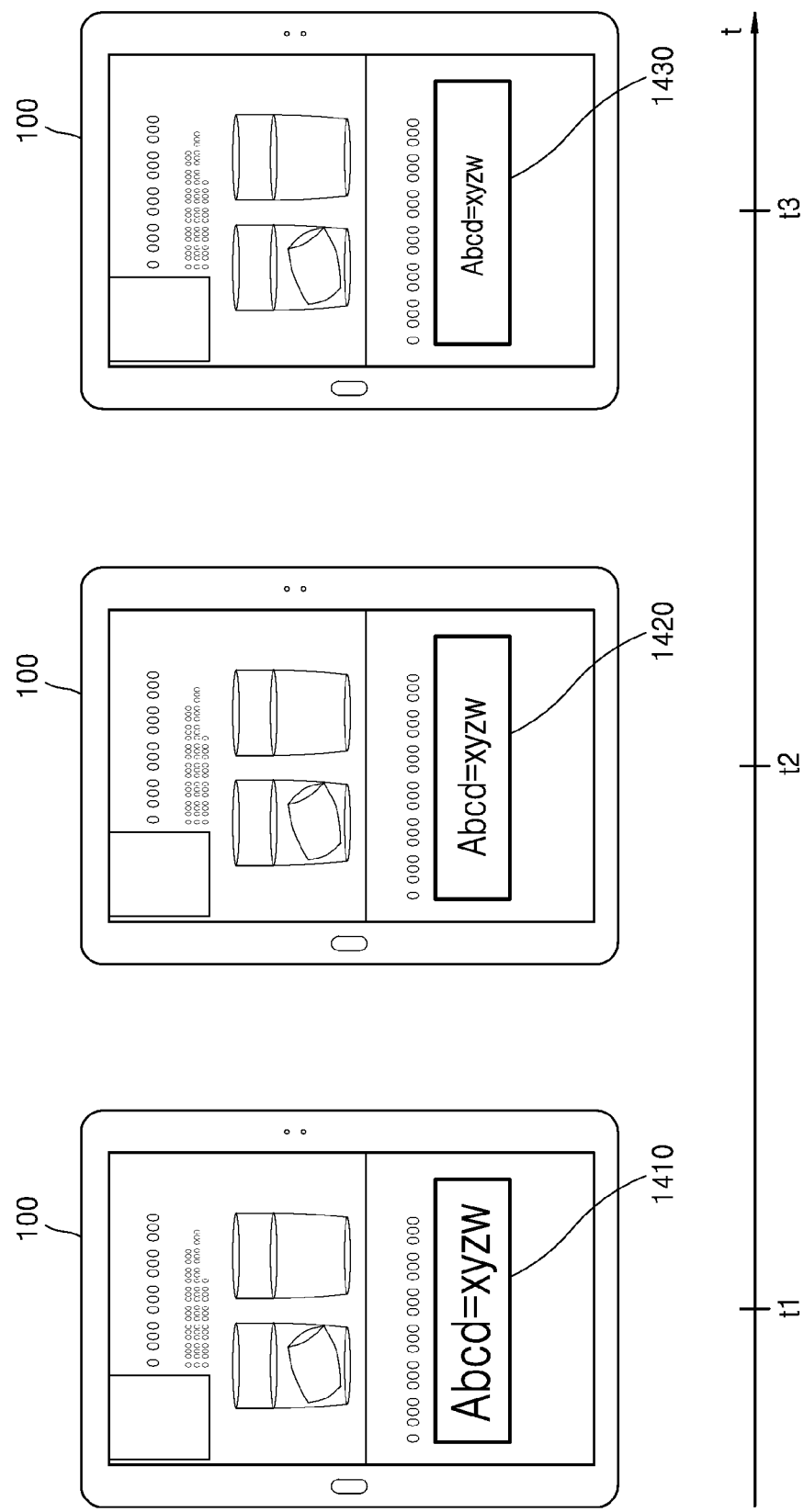
FIG. 14 is a diagram for describing a method used by a device to change a size of review content based on a change in an amount of user's memory according to an exemplary embodiment.

FIG. 14 is a diagram for describing a method used by the device 100 to changes a size of review content 1410, 1420, and 1430 based on a change in an amount of user's memory according to an exemplary embodiment.

The amount of user's memory may be reduced over time. For example, referring to FIG. 14, the amount of user's memory for the review content 1410, 1420, and 1430 may be different at the times t1, t2, and t3. The device 100 may differently adjust transparency levels of the first time review content 1410 that is review content output at the time t1, the second time review content 1420 that is review content output at the time t2, and the third time review content 1430 that is review content output at the time t3. In this regard, the time t1 may be a time when the review content 1410 is selected, the time t2 may be a time when the amount of user's memory for the review content 1420 is equal to or smaller than a first threshold value, and the time t3 may be a time when the amount of user's memory for the review content 1430 is equal to or smaller than a second threshold value over time. The first threshold value may be greater than the second threshold value. For example, the first threshold value may be set to be 70% of the maximum amount of the user's memory, and the second threshold value may be set to be 50% of the maximum amount of the user's memory.

The device 100 may change the size of the review content 1410, 1420, and 1430 at the times t1, t2, and t3 to become smaller over time. In this regard, it is assumed that a user reference operation on the review content 1410, 1420, and 1430 is not detected from the time t1 to the time t3. The device 100 may induce a user to refer to the review content 1410, 1420, and 1430 by changing the size of the review content 1410, 1420, and 1430 to be small according to a reduction in the amount of user's memory. Using an graphic user interface that decreases the size of the review content 1410, 1420, and 1430 as time goes by, the device 100 may allow the user to intuitively notice that his/her memory about the review content 1410, 1420, and 1430 fades away like the size of the review content 1410, 1420, and 1430 becoming smaller.

Figure 15:
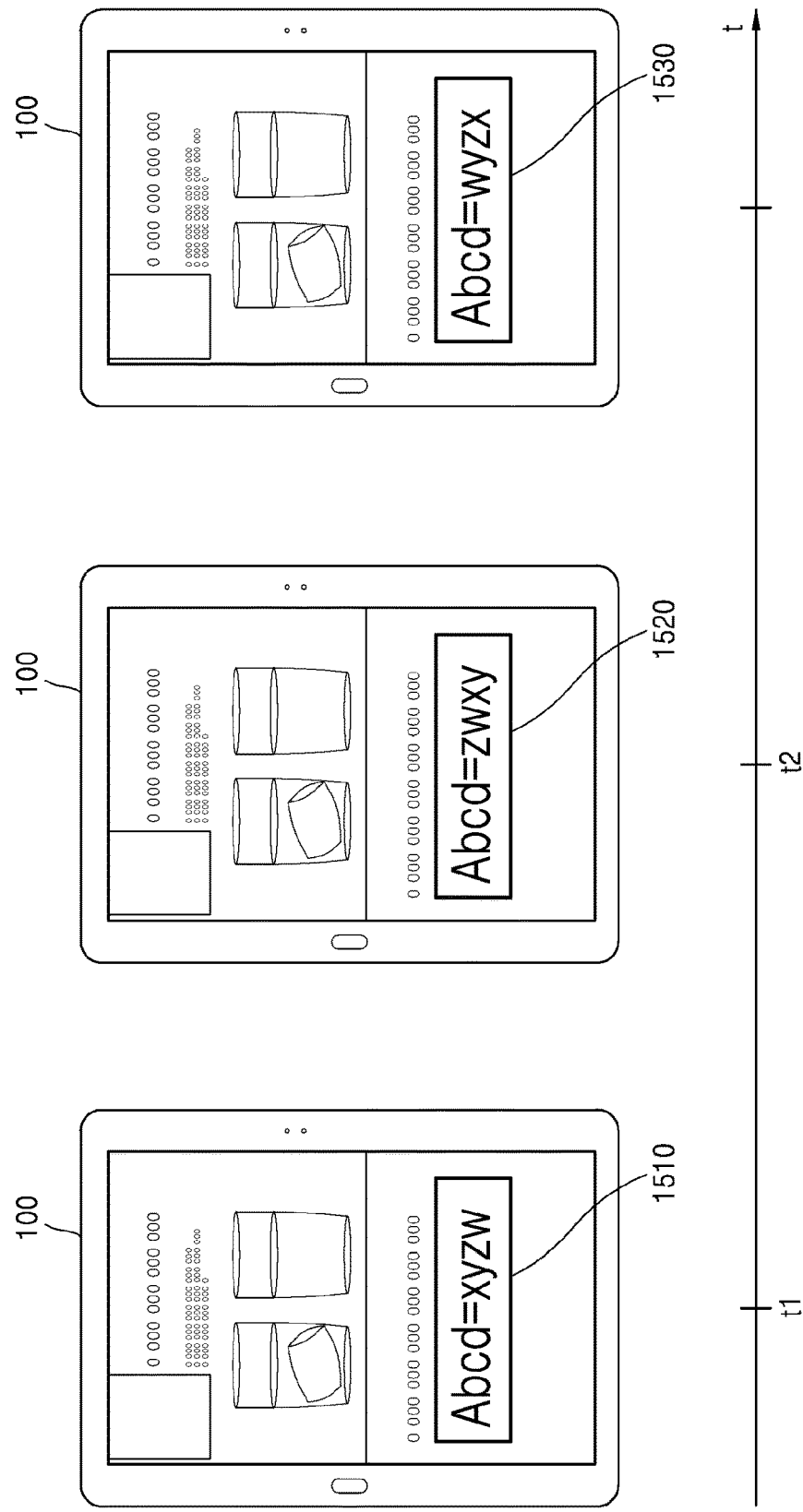
FIG. 15 is a diagram for describing a method used by a device to change an arrangement order of review content based on a change in an amount of user's memory according to an exemplary embodiment.

FIG. 15 is a diagram for describing a method in which the device 100 changes an arrangement order of review content 1510, 1520, and 1530 based on a change in an amount of user's memory according to an exemplary embodiment.

The amount of user's memory may be reduced over time. For example, referring to FIG. 15, the amount of user's memory for the review content 1510, 1520, and 1530 may be different at the times t1, t2, and t3. The device 100 may set the arrangement order of the first time review content 1510 that is review content output at the time t1, the second time review content 1520 that is review content output at the time t2, and the third time review content 1530 that is review content output at the time t3, to be different from each other. The time t1 may be a time when the review content 1510 is selected, the time t2 may be a time when the amount of user's memory for the review content 1520 is equal to or smaller than a first threshold value, and the time t3 may be a time when the amount of user's memory for the review content 1530 is equal to or smaller than a second threshold value over time.

The device 100 may change the arrangement order of the review content 1520 and 1530 at the times t2 and t3 to be different from the arrangement order of the review content 1510 seen the first time t1. The device 100 may change the arrangement order to be more complex over time from that at the time t1. Changing the arrangement order to be more complex may mean changing the arrangement order of review content 1510 to be greatly different from the arrangement order of the review content 1510 seen the first time. In this regard, it is assumed that a user reference operation on the review content 1510, 1520, and 1530 is not detected from the time t1 to the time t3. The device 100 may induce a user to refer to the review content 1510, 1520, and 1530 by changing the arrangement order of the review content 1510, 1520, and 1530 to be complex according to a reduction in the amount of user's memory.

Figure 16:
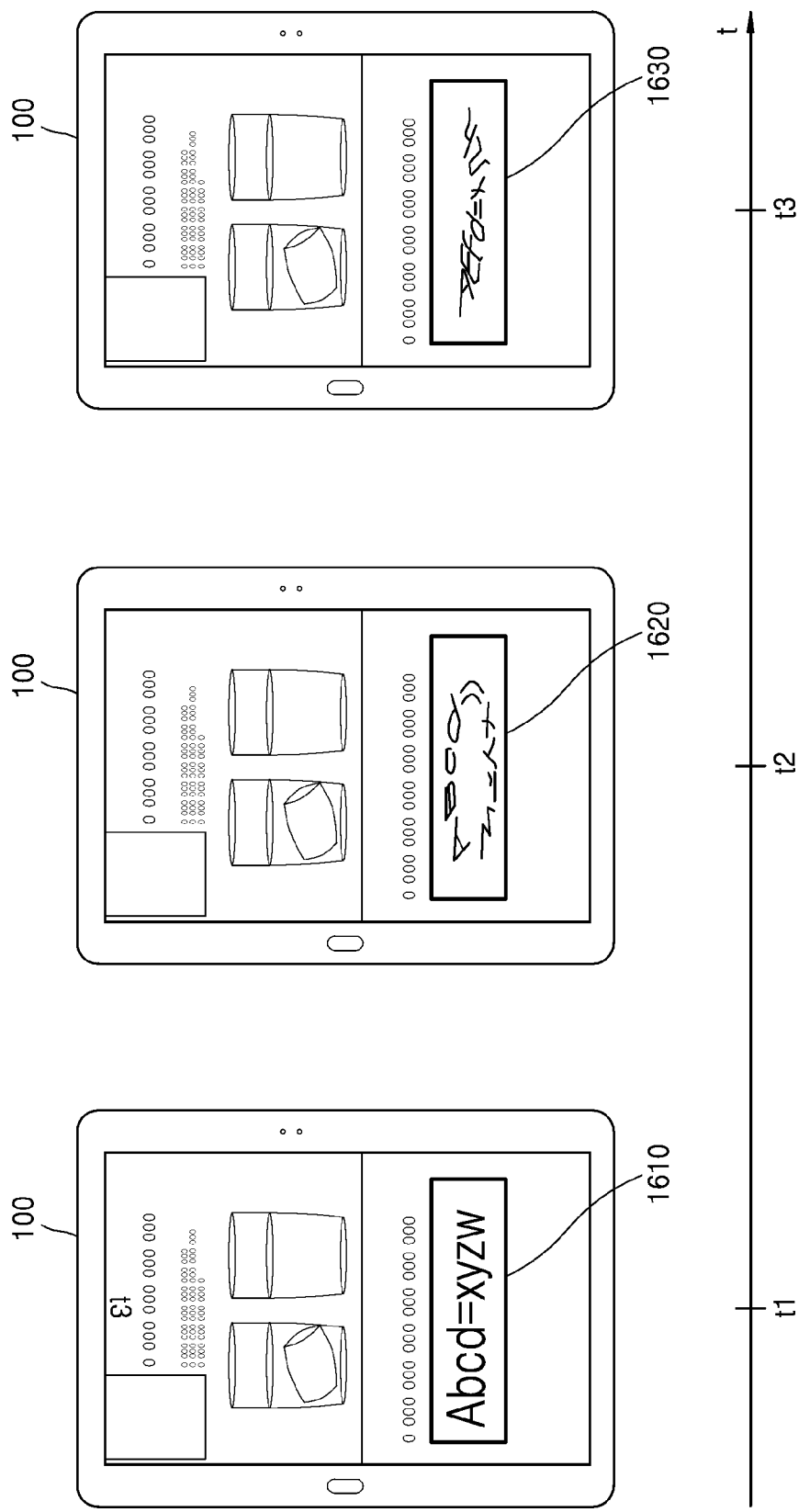
FIG. 16 is a diagram for describing a method used by a device to change a form of review content based on a change in an amount of user's memory according to an exemplary embodiment.

FIG. 16 is a diagram for describing a method in which the device 100 changes a form of review content 1610, 1620, and 1630 based on a change in an amount of user's memory according to an exemplary embodiment.

The amount of user's memory may be reduced over time. For example, referring to FIG. 16, the amount of user's memory for the review content 1610, 1620, and 1630 may be different at the times t1, t2, and t3. The device 100 may differently set the form of the first time review content 1610 that is review content output at the time t1, the second time review content 1620 that is review content output at the time t2, and the third time review content 1630 that is review content output at the time t3. The time t1 may be a time when the review content 1610 is selected, the time t2 may be a time when the amount of user's memory for the review content 1620 is equal to or smaller than a first threshold value, and the time t3 may be a time when the amount of user's memory for the review content 1630 is equal to or smaller than a second threshold value over time.

The device 100 may change the form of the review content 1620 and 1630 at the times t2 and t3 to be different from the form of the review content 1610 seen the first time. The device 100 may change the form of the review content 1620 and 1630 to be more complex over time from those at the time t1. Changing the form of the review content 1620 and 1630 to be more complex may mean changing the form of the review content 1620 and 1630 to be greatly different from the form of the review content 1610 seen the first time. In other words, the device 100 may decrease the readability of the review content 1610, 1620, and 1630 over time. In this regard, it is assumed that a user reference operation on the review content 1610, 1620, and 1630 is not detected from the time t1 to the time t3. The device 100 may induce a user to refer to the review content 1610, 1620, and 1630 by changing the form of the review content 1610, 1620, and 1630 to be complex according to a reduction in the amount of user's memory. Using an graphic user interface that increases complexity of the review content 1610, 1620, and 1630 as time goes by, the device 100 may allow the user to intuitively notice that his/her memory about the review content 1610, 1620, and 1630 becomes fuzzy or hazy like the review content 1410, 1420, and 1430 becoming harder to recognize over time.

Figure 17:
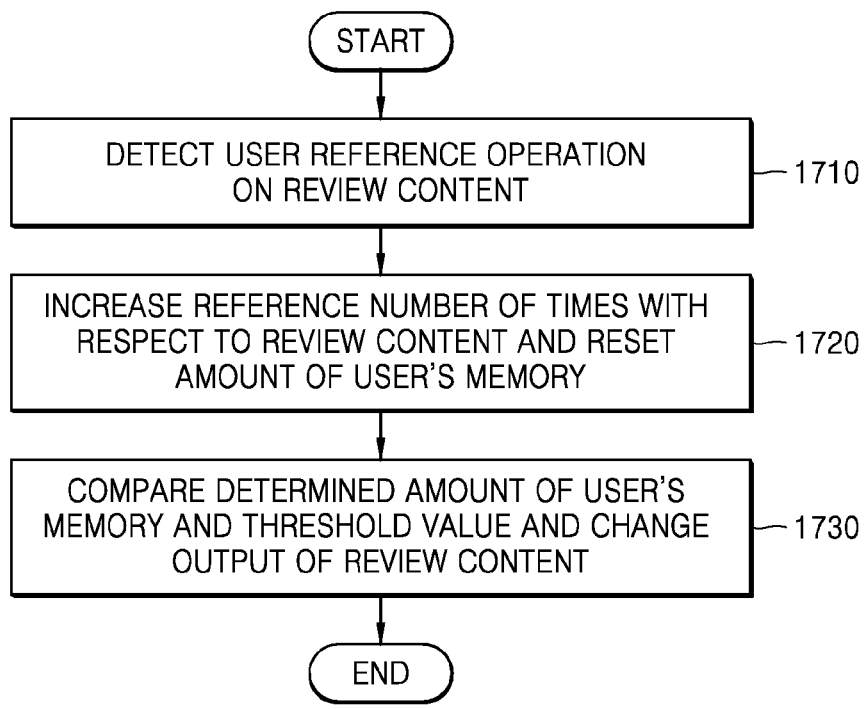
FIG. 17 is a flowchart of a method used by a device to change an amount of user's memory when a reference operation on review content is detected according to an exemplary embodiment.

FIG. 17 is a flowchart of a method in which the device 100 changes the amount R of user's memory when detecting a reference operation on the review content 105 according to an exemplary embodiment.

In operation S1710, the device 100 may detect the user reference operation on the review content 105. The device 100 may determine that a user has referred to the review content 105 when detecting a user input with respect to the review content 105 after a selected time. For example, the device 100 may determine that the user has referred to the review content 105 when detecting a user touch input with respect to the review content 105. As another example, the device 100 may determine that the user has referred to the review content 105 when detecting user's eyes for the review content 105 through a sensor.

In operation S1720, the device 100 may increase a reference number of times with respect to the review content 105 and reset the amount R of user's memory. For example, the device 100 may increase a value of the reference number of times by 1 when detecting the user reference operation on the review content 105.

The device 100 may determine the amount R of user's memory for the review content 105 using parameters for determining the amount R of user's memory by reflecting the changed reference number of times.

The smaller the amount R of user's memory determined by the device 100, the higher the difficulty and the importance of the review content 105. The greater the amount R of user's memory, the better the user's memory. The greater the amount R of user's memory, the greater the reference number of times. The amount R of user's memory may be reduced over time. The amount R of user's memory regarding the review content 105 may be calculated according to various types of equations based on the parameters for determining the amount R of user's memory reflecting these characteristics.

In operation S1730, the device 100 may compare the determined amount R of user' memory and a threshold value and change output of the review content 105. The device 100 may determine the amount R of user's memory reduced over time based on information regarding the determined amount R of user's memory according to the reference number of times increased in operation S1720. For example, the amount R of user's memory reduced over time may be determined according to Equation 1 above. Referring to Equation 1 above, the device 100 may change the time t0 to a reference time with respect to the review content 105 to measure the amount R of user's memory changing over time.

According to an exemplary embodiment, the device 100 may change at least one of a size, a color, a form, a layout, a font, a character style (e.g., bold, italic, or underlined), an arrangement order, and a transparency of the review content 105. According to another exemplary embodiment, the device 100 may determine a type of the review content 105 such as text, an image, and a video and change an output form of the review content 105. Meanwhile, a method in which the device 100 changes the output of the review content 105 is the same as operation S230 described with reference to FIG. 2 above.

FIGS. 18 and 19 are tables illustrating results obtained when the device 100 outputs parameters for determining an amount of user's memory for the review content 105 based on a preset basis and information regarding the amount of user's memory for the review content 105.

The device 100 may display the plurality of pieces of review content (e.g., review content 105) and the parameters for determining the amount of user's memory for the review content (e.g., review content 105).

FIG. 18 is a table illustrating the parameters for determining the amount of user's memory for the review content (e.g., review content 105) and the information regarding the amount of user's memory in an earlier order of first reference date and time. Meanwhile, FIG. 19 is a table illustrating the parameters for determining the amount of user's memory for the review content (e.g., review content 105) and the information regarding the amount of user's memory in earlier order of second reference date and time. The device 100 may determine the amount of the user's memory by using all or some of the parameters.

In this regard, the first and second reference dates and times may be identified according to a time taken for a user to refer to the review content 105. For example, the user may simply check the review content 105 for a short period of time and may review the review content 105 longer than a predetermined period of time. In FIGS. 18 and 19, the first reference date and time may indicate a time when the user checks the review content 105 for a short period of time, and the second reference date and time may indicate a time when the user reviews the review content 105. The tables illustrated in FIGS. 18 and 19 may further include information of duration during which the review content 105 is displayed through a screen of the device 100.

The device 100 may identify a user reference operation according to whether the user reference operation is a checking operation or a review operation relating to the review content 105. In this regard, whether the user reference operation is the checking operation or the review operation relating to the review content 105 may be determined based on the time taken for the user to refer to the review content 105. The device 100 may check the time taken for the user to refer to the review content 105 through a sensor. The user may directly input information regarding whether a predetermined reference operation is the checking operation or the review operation relating to the review content 105 to the device 100.

Meanwhile, the parameters for determining the amount of user's memory of Equation 1 described above may be different according to a type of the user reference operation. According to an exemplary embodiment, the device 100 may reflect a difference in the user reference operation when determining the amount of user's memory by using a reference number of times among the parameters for determining the amount of user's memory. For example, the device 100 may increase the reference number of times by 1 when the user checks the review content 105 and by 3 when the user review the review content 105.

Figure 20:
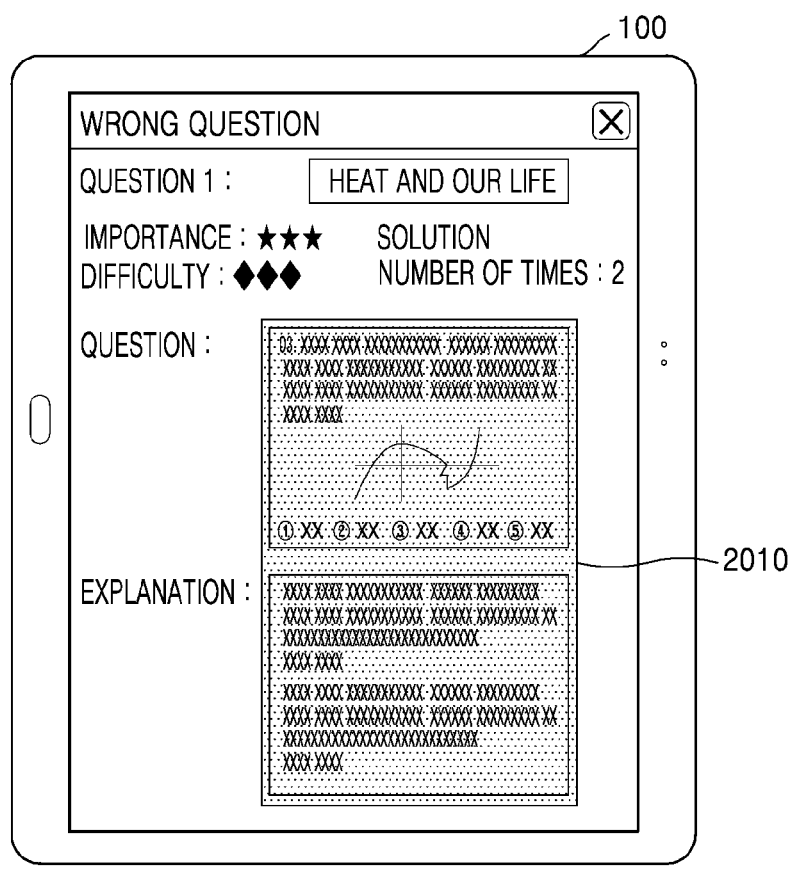
FIG. 20 is a diagram for describing a method used by a device to edit review content using parameters for determining an amount of user's memory and information regarding the amount of user's memory according to an exemplary embodiment.

FIG. 20 is a diagram for describing a method in which the device 100 edits the review content 105 using parameters for determining an amount of user's memory and information regarding the amount of user's memory according to an exemplary embodiment.

Referring to FIG. 20, the device 100 may extract and independently display the review content 105 provided with identification information. The device 100 may display the parameters for determining the amount of user's memory on the independently displayed review content 105. For example, when content relates to a textbook, the device 100 may extract questions provided with wrong answers as the review content 105. The device 100 may display the extracted questions with the parameters for determining the amount of user's memory including difficulty, importance, and a reference number of times.

The device 100 may determine the amount of user's memory based on the parameters for determining the amount of user's memory for the extracted review content 105. The device 100 may change output of the review content 105 according to the amount of user's memory determined for the review content 105. For example, the device 100 may display the extracted questions to be opaque when the amount of user's memory for the extracted questions is equal to or less than a threshold value.

Figure 21:
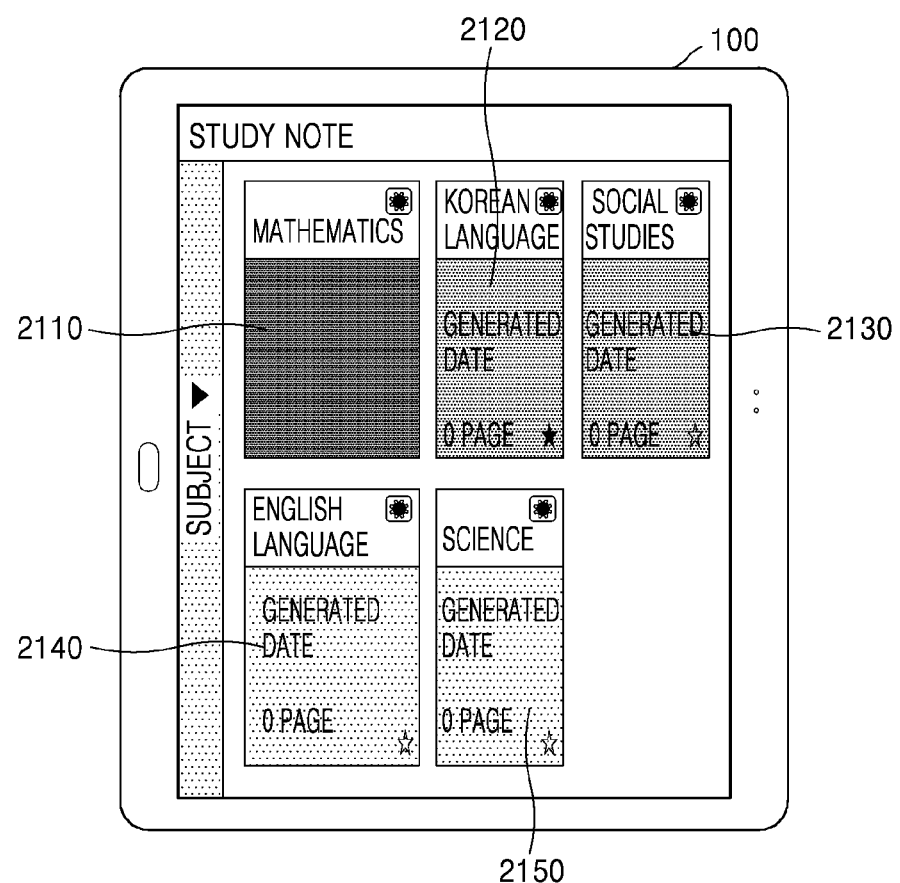
FIG. 21 is a diagram for describing a method used by a device to display information regarding a plurality of pieces of content based on information regarding an amount of user's memory for review content included in the plurality of pieces of content according to an exemplary embodiment.

FIG. 21 is a diagram for describing a method in which the device 100 displays information regarding a plurality of pieces of content based on information regarding an amount of user's for the review content (e.g., review content 105) included in the plurality of pieces of content memory according to an exemplary embodiment.

The device 100 may collect and analyze information regarding the review content (e.g., review content 105) included in the plurality of pieces of content. The device 100 may change a display of the information regarding the plurality of pieces of content according to a result of comparing the amount of user's for the review content (e.g., review content 105) included in the plurality of pieces of content. In this regard, the information regarding the plurality of pieces of content may include identification information such as marks and index capable of identify a predetermined piece of content among the plurality of pieces of content. For example, the device 100 may obtain information regarding the amount of user's memory for review content included in a plurality of different digital books 2110, 2120, 2130, 2140, and 2150.

The device 100 may display the information regarding the plurality of pieces of content in a descending order of the plurality of pieces of content including the review content occupying a small amount of user's memory based on the obtained information regarding the amount of user's memory. For example, the device 100 may display covers of the digital books 2110, 2120, 2130, 2140, and 2150 in a descending order of the digital books 2110, 2120, 2130, 2140, and 2150 including the review content occupying a small amount of user's memory.

The device 100 may increase a change level of the information regarding the plurality of pieces of content that are output in the descending order of the review content occupying a small amount of user's memory based on the obtained information regarding the amount of user's memory. For example, the device 100 may display the covers of the digital books 2110, 2120, 2130, 2140, and 2150 to be opaque in the descending order of the digital books 2110, 2120, 2130, 2140, and 2150 including the review content occupying a small amount of user's memory.

Figure 22:
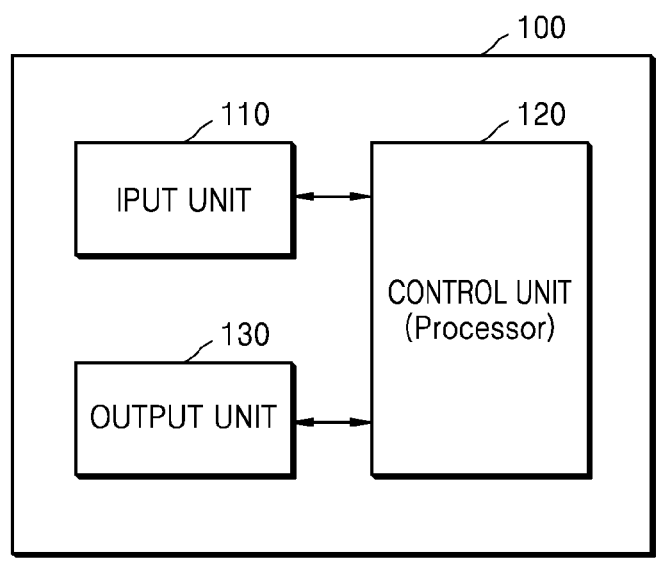
FIGS. 22 and 23 are block diagrams for describing a configuration of a device according to an exemplary embodiment.
Figure 23:
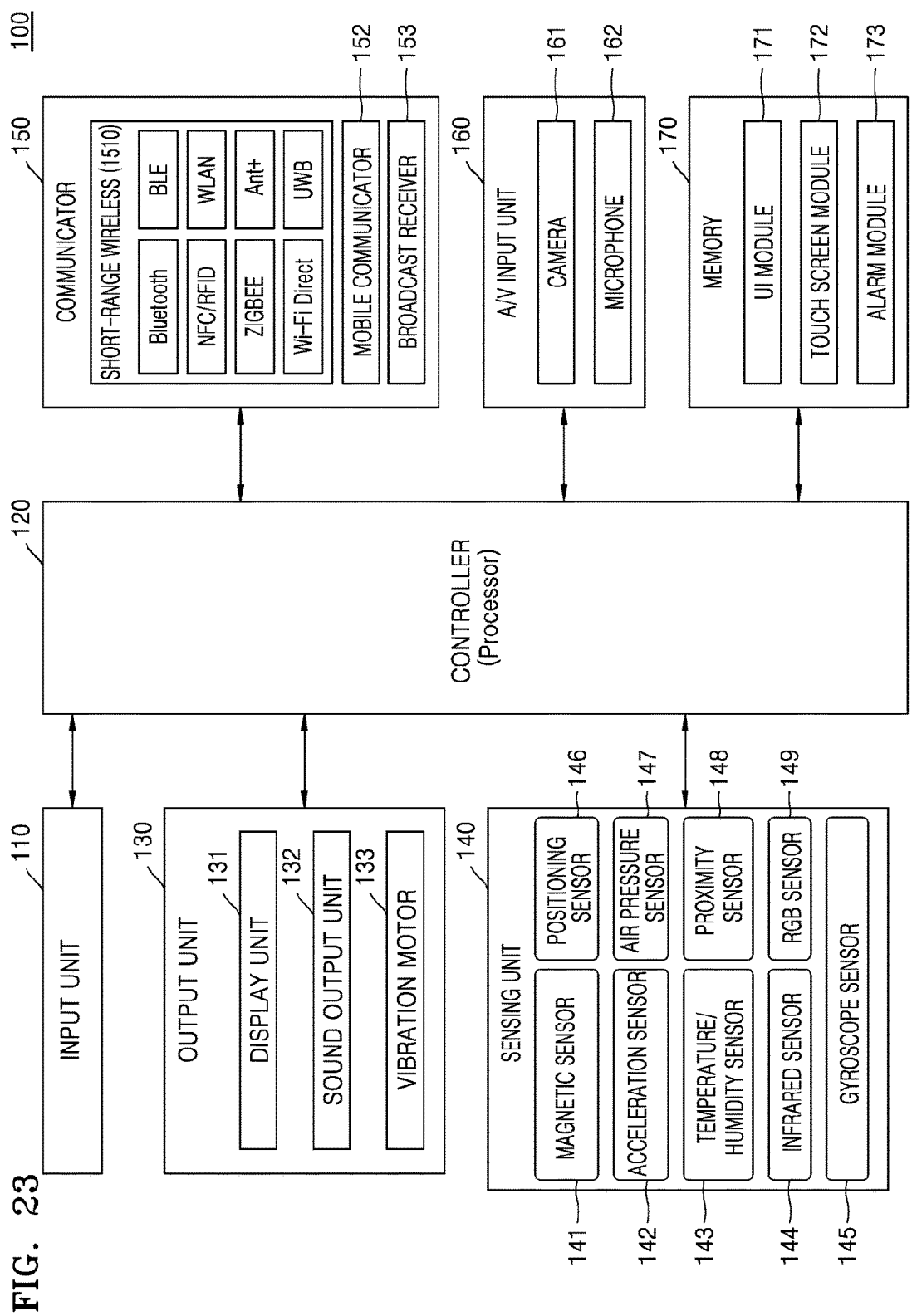

FIGS. 22 and 23 are block diagrams for describing a configuration of the device 100 according to an exemplary embodiment.

As shown in FIG. 22, the device 100 according to an exemplary embodiment may include an input unit 110, a control unit (e.g., central processing unit) 120, and an output unit 130. However, all of the constituents illustrated in FIG. 22 are not indispensable constituents. The device 100 may be embodied with more or less constituents than those illustrated in FIG. 22.

For example, as shown in FIG. 23, the device 100 according to an exemplary embodiment may further include a sensing unit (e.g., sensor) 140, a communication unit 150, an audio/video (A/V) input unit 160, and a memory 170 other than the input unit 110, the control unit 120, and the output unit 130.

Descriptions of the constituents will be given below.

The input unit 110 means a unit for a user to input data for controlling the device 100. For example, the input unit 110 may include a key pad, a dome switch, a touch pad (electrostatic capacitive type, resistive type, IR detecting type, surface acoustic wave type, integral tension detection type, piezoelectric type, etc.), a jog wheel, or a jog switch but is not limited thereto.

The input unit 110 may obtain information from a user or an external device. For example, the input unit 110 may obtain attribute information of the review content 105. The input unit 110 may provide a user interface capable of the attribute information importance and difficulty of the review content 105.

The input unit 110 may obtain information regarding parameters for determining an amount of user's memory including reference information after a time when the review content 105 is selected and information regarding the user's memory, in addition to the attribute information of the review content 105. The input unit 110 may obtain the information regarding parameters for determining the amount of user's memory including attribute information of review content, reference information, and information regarding the user' memory that are stored in each of other devices from other devices.

The control unit 120 may generally control the overall operation of the device 100. For example, the control unit 120 may generally control the input unit 110, the output unit 130, the sensing unit 140, the communication unit 150, and the A/V input unit 160 by executing programs stored in the memory 170.

The control unit 120 may extract one or more pieces of review content providing identification information from content. The control unit 120 may classify the one or more pieces of review content into different categories based on the identification information.

The control unit 120 may determine an amount of user's memory at a preset time based on attribute information, reference information after the time when the review content is selected, and parameters for determining the amount of user's memory including information regarding the user's memory. For example, the control unit 120 may measure duration during which review content is displayed or reproduced to determine the amount of the user's memory about the review content. Meanwhile, the control unit 120 may compare preset average memory and the user's memory to determine the information regarding the user's memory. A method in which the control unit 120 determines the amount of user's memory based on the parameters for determining the user's memory is the same as described with reference to FIG. 2 above.

The control unit 120 may also compare the determined amount of user's memory and a threshold. The threshold may be set to be a value corresponding to a predetermined percentage of the maximum amount of the user's memory. The control unit 120 may control the output unit 130 such that output of the review content 105 is changed according to a result of comparison. For example, the control unit 120 may determine whether the determined amount of user's memory is equal to less than the threshold, and, when the determined amount of user's memory is equal to less than the threshold, may control the output unit 130 such that at least one of a transparency, a color, a form, a size, a layout, a font, a character style (e.g., bold, italic, or underlined), and an arrangement order of the review content 105 is changed and output. As another example, the control unit 120 may determine a type of the review content 105 among text, images, and videos and may change the output of the review content 105 according to the type of the review content 105.

The control unit 120 may compare the determined amount of user's memory and the threshold to determine a recommendation review time when the review content 105 is referred to. The control unit 120 may control the output unit 130 to change the output of the review content 105 at the recommendation review time.

The control unit 120 may obtain information regarding a recommendation review time of a plurality of pieces of stored review content. The control unit 120 may determine an arrangement order of the plurality of pieces of review content displayed at the obtained recommendation review time of the plurality of pieces of review content.

The control unit 120 may determine an event schedule relating to review content stored in the memory 170, and, when the event schedule is present within a preset time range, may control the output unit 130 to change and output the review content.

When the sensor unit 140 detects a user reference operation, the control unit 120 may change a selection time when the review content 105 is selected to a review time when the user reference operation is detected, may increase a reference number of times, and may re-determine the amount of user's memory based on the changed review time and the increased reference number of times. The control unit 120 may re-determine the recommendation review time for the review content 105 based on the re-determined the amount of user's memory.

The output unit 130 may be used to output an audio signal, a video signal, or a vibration signal and may include a display unit 131, an acoustic output unit 132, and a vibration motor 133.

The display unit (e.g., display) 131 may display information processed by the device 100. For example, the display unit 131 may display the selected review content 105. The display unit 131 may change the output of the review content 105 according to a change in the amount of user's memory.

The display unit 131 may display a plurality of pieces of review content and information regarding one or more parameters for determining the amount of user's memory for each of the plurality of pieces of review content. The display unit 131 may display the one or more pieces of review content of each of the plurality of pieces of content stored in the memory 170 and an amount of user's memory for the one or more pieces of review content.

Meanwhile, if the display unit 131 and a touch pad are arranged as layers and constitute a touch screen, the display unit 131 may be used not only as an output device, but also as an input device. The display unit 131 may include at least one of a liquid crystal display (LCD), a thin-film transistor (TFT) LCD, an organic light emitting diode, a flexible display, a 3D display, and an electrophoretic display. Furthermore, according to an exemplary embodiment, the device 100 may include two or more display units 131. Here, the two or more display units 131 may be arranged to face each other via a hinge.

The acoustic output unit 132 outputs audio data received via the communication unit 150 or stored in the memory 170. Furthermore, the acoustic output unit 132 outputs acoustic signals related to functions performed by the device 100 (e.g., a call signal reception sound, a message reception sound, a notification sound, etc.). The acoustic output unit 132 may include a speaker or a buzzer.

The vibration motor 133 may output a vibration signal. For example, the vibration motor 133 may output a vibration signal corresponding to output of audio data or video data (e.g., a call signal reception sound, a message reception sound, etc.). Furthermore, the vibration motor 133 may output a vibration signal when a touch is input to a touch screen.

The sensing unit 140 may detect a state of the device 100 or a state of a periphery of the device 100 and transfer the detected information to the control unit 120. For example, the sensing unit 140 may detect a user reference operation on the review content 105 and transfer the detected user reference operation to the control unit 120.

The sensing unit 140 may include at least one of a magnetic sensor 141, an acceleration sensor 142, a temperature/humidity sensor 143, an infrared ray sensor 144, a gyroscope sensor 145, a location sensor 146, an atmospheric pressure sensor 147, a proximity sensor 148, and an RGB (illuminance) sensor 149 but is not limited thereto. Functions of the above-stated sensors are obvious to one of ordinary skill in the art from titles thereof, and thus detailed descriptions thereof are omitted.

The communication unit 150 may include one or more constituents enabling communication between the device 100 and an external device or between the device 100 and a server. For example, the communication unit 150 may include a short-range wireless communication unit 151, a mobile communication unit 152, and a broadcasting receiving unit 153.

The short-range wireless communication unit 151 may include a Bluetooth communication unit, a Bluetooth Low Energy (BLE) communication unit, a near field communication (NFC) unit, a WLAN (Wi-Fi) communication unit, a Zigbee communication unit, an infrared data association (IrDA) communication unit, a Wi-Fi direct (WFD) communication unit, an ultra wideband (UWB) communication unit, or an Ant+ communication unit. However, the inventive concept is not limited thereto.

The mobile communication unit 152 may transmit and receive wireless signals to and from at least one of a station, an external terminal, and a server on a mobile communication network. In this regard, the wireless signals may include voice call signals, video call signals, or various types of data regarding transmission/reception of text/multimedia messages.

The broadcasting receiving unit 153 may receive broadcasting signals and/or information regarding broadcasting from outside via broadcasting channels. Broadcasting channels may include satellite channels and ground wave channels. According to embodiments, the device 100 may not include the broadcasting receiving unit 153.

The communication unit 150 may receive review content, parameters for determining an amount of user's memory for the review content, and information regarding the amount of user's memory that are stored in an external device from the external device. The communication unit 150 may transmit the review content, the parameters for determining the amount of user's memory for the review content, and the information regarding the amount of user's memory that are stored in the device 100 to the external device.

The A/V input unit 160 is a unit for inputting audio signals or video signals and may include a camera 161 and a microphone 162. The camera 161 may obtain an image frame including a still image or a moving picture via an image sensor in a video call mode or an image pickup mode. An image captured by the image sensor is processed by the control unit 130 or a separate image processing unit.

An image frame processed by the camera 161 may be stored in the memory 170 or transmitted to outside via the communication unit 150. According to embodiments, the device 100 may include two or more cameras 161.

The microphone 162 receives an external acoustic signal and processes the external acoustic signal into digital voice signal. For example, the microphone 162 may receive acoustic signals from an external device or a speaker. The microphone 162 may utilize various noise reduction algorithms to reduce noises during reception of external acoustic signals.

The memory 170 may store programs used by the control unit 120 for processing data and controlling components of the device 100 or input/output data (e.g., a plurality of menus, a plurality of first layer sub menus respectively corresponding to the plurality of menus, a plurality of second layer sub menus respectively corresponding to the plurality of first layer sub menus, etc.)

The memory 170 may include at least one of storage media including a flash memory type storage medium, a multimedia card micro type storage medium, a card type memory (e.g., a SD memory or a XD memory), a random access memory (RAM), a static RAM (SRAM), a read-only memory (ROM), an electrically erasable-programmable ROM (EEPROM), a programmable ROM (PROM), a magnetic memory, a magnetic disk, and an optical disc. Furthermore, the device 100 may utilize a web storage or a cloud server that functions as the memory 170 on the internet.

Programs stored in the memory 170 may be categorized into a plurality of modules, for example, a UI module 171, a touch screen module 172, a notification module 173, etc.

The UI module 171 may provide a UI or a GUI, which is customized to a particular application and works in conjunction with the device 100. The touch screen module 172 may detect a touch gesture of a user on a touch screen and transmit information regarding the touch gesture to the control unit 120. The touch screen module 172 according to an embodiment may recognize and analyze a touch code. The touch screen module 172 may also be embodied as a separate hardware unit including a controller.

Various sensors may be arranged inside or nearby a touch screen to detect a touch or a proximity touch on the touch screen. An example of sensors for detecting a touch on a touch screen may be a tactile sensor. A tactile sensor refers to a sensor for detecting contact of a particular object having a sensitivity greater than or equal to the sense of touch. A tactile sensor may detect various information, such as roughness of a contact surface, hardness of a contacting object, a temperature at a contact point, etc.

Furthermore, another example of sensors for detecting a touch on a touch screen may be a proximity sensor.

A proximity sensor refers to a sensor that detects existence of an object approaching to a designated detection surface or a nearby object using electromagnetic force or an infrared ray (IR) without a mechanical contact. Examples of proximity sensors include a transmissive photoelectric sensor, a direct-reflection type photoelectric sensor, a mirror-reflection type photoelectric sensor, a high-frequency wave emission type proximity sensor, an electrostatic capacitance type proximity sensor, a magnetic type proximity sensor, and an IR proximity sensor. Touch gestures of a user may include tapping, touch & hold, double tapping, dragging, panning, flicking, drag-and-drop, and swiping.

The notification module 173 may generate a signal for notifying an event occurring at the device 100. Examples of events occurring at the device 100 may include reception of a call signal, reception of a message, input of a key signal, notification of a schedule, and acquisition of a user input. The notification module 173 may inform the user of an existence of an event when a preset event schedule for the review content 105 is included in a preset time range. The notification module 173 may output notification signals in the form of video signals via the display unit 151, in the form of audio signals via the acoustic output unit 132, or in the form of vibration signals via the vibration motor 133.

The exemplary embodiments may be implemented as computer instructions which can be executed by various computer means, and recorded on a computer-readable medium. The computer-readable medium may include program commands, data files, data structures or a combination thereof. Program instructions recorded on the medium may be particularly designed and structured for the inventive concept or available to those skilled in computer software. Examples of the computer-readable recording medium include magnetic media, such as a hard disk, a floppy disk, and a magnetic tape; optical media, such as a compact disk-read only memory (CD-ROM) and a digital versatile disc (DVD); magneto-optical media, such as floptical disks; a read-only memory (ROM); a random access memory (RAM); and a flash memory. The medium may be a transmission medium, such as an optical or metal line, a waveguide, or carrier waves transferring program commands, data structures, and the like. Program commands may include, for example, a high-level language code that can be executed by a computer using an interpreter, as well as a machine language code made by a complier.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of outputting content on a display of a device, the method comprising:

obtaining through a user interface controlled by a processor, attribute information of review content displayed on the display referred by a user at a first reference time;

determining, by the processor, a probability that the review content remains in the user's memory at a second reference time based on the obtained attribute information, a number of reference times that the review content has been referred repeatedly since the first reference time, and a measured elapsed time between the first reference time and the second reference time, wherein the number of reference times is determined according to times taken for the user to refer to the review content;

comparing, by the processor, the determined probability and a threshold value; and changing, by the processor, at the second reference time, a format in which the review content is output to the display and outputting the review content in the changed format, in response to the probability being determined to be equal to or less than the threshold value at the second reference time.

2. The method of claim 1, wherein the changing the format in which the review content is output comprises changing, by the processor, at least one of a transparency, a color, a form, a size, a layout, a font, a character style, and an arrangement order of the review content in response to the probability being determined as equal to or less than the threshold value.

3. The method of claim 1, wherein the changing the format in which the review content is output comprises:
comparing, by the processor, the determined probability and the threshold value;
determining, by the processor, a recommendation review time of the review content based on a result of the comparison; and
changing, by the processor, the format of the review content at the determined recommendation review time.

4. The method of claim 1, further comprising:
obtaining, by the processor, information regarding a recommendation review time of a plurality of pieces of review content, the plurality of pieces of review content including the review content; and
determining, by the processor, an arrangement order of the plurality of pieces of review content displayed at the obtained recommendation review time of the plurality of pieces of review content.

5. The method of claim 1, further comprising determining, by the processor, an event schedule for the review content, wherein the format in which the review content is output is changed in response to the event schedule being present within a preset time period.

6. The method of claim 1, wherein the determining the probability comprises obtaining, by the processor, information regarding the user's memory that is determined by comparing preset average memory and the user's memory.

7. The method of claim 1, wherein the attribute information comprises a degree of importance and a degree of difficulty of the review content.

8. The method of claim 1, further comprising:
detecting, by a sensor controlled by the processor, a user reference operation on the review content;
changing, by the processor, a selection time when the review content is to be selected to a review time when the user reference operation is detected in response to the user reference operation being detected;

increasing, by the processor, a reference number of times after the selection time is changed to the review time; and
re-determining, by the processor, the probability based on the changed review time and the increased reference number of times.

9. The method of claim 8, further comprising: determining, by the processor, a recommendation review time of the review content based on the re-determined probability.

10. The method of claim 1, further comprising: displaying on the display of the device, plurality of pieces of review content and information regarding one or more parameters for determining a probability that the review content remains in the user's memory for each of the plurality of pieces of review content.

11. The method of claim 1, further comprising: displaying on the display of the device, one or more pieces of review content from a plurality of pieces of content stored in the device and a probability that the review content remains in the user's memory for the one or more pieces of review content.

12. The method of claim 1, further comprising: extracting, by the processor, one or more pieces of review content provided with identification information from content displayed on the device.

13. A non-transitory computer readable storage medium storing a computer program that is executable by a computer to perform the method of claim 1.

14. A device for outputting content on a display of the device, the device comprising:
a display comprising a user interface;
a memory storing one or more instructions;
a processor configured to execute the one or more instructions to:
control the user interface to display review content on the display to be referred by a user at a first reference time and to obtain attribute information of the review content;
determine a probability that the review content remains in the user's memory at a second reference time based on the obtained attribute information, a number of reference times that the review content has been referred repeatedly since the first reference time, and a measured elapsed time between the first referenced time and the second reference time and compare the determined probability and a threshold value, wherein the number of reference times is determined according to times taken for the user to refer to the review content; and
control the display to change, at the second reference time, a format in which the review content is output to the display and output the review content in the changed format, in response to the probability being determined to be equal to or less than the threshold value at the second reference time.

15. The device of claim 14, wherein the processor is further configured to control the display to change at least one of a transparency, a color, a form, a size, a layout, a font, a character style, and an arrangement order of the review content in response to the probability being equal to or less than the threshold value.

16. The device of claim 14, wherein the processor is further configured to compare the determined probability and the threshold value, determine a recommendation review time of the review content based on a result of the comparison, and change the format of the review content at the determined recommendation review time.

17. The device of claim 14, wherein the processor is further configured to obtain information regarding a recommendation review time of a plurality of pieces of review content and determine an arrangement order of the plurality of pieces of review content displayed at the obtained recommendation review time of the plurality of pieces of review content.

18. The device of claim 14, wherein the processor is further configured to determine an event schedule for the review content and control the display to change the format in which the review content is output in response to the event schedule being present within a preset time period.

19. The device of claim 14, wherein the processor is further configured to obtain information regarding the user's memory, compare preset average memory and the user's memory, and determine the information regarding the user's memory based on a result of the comparison.

20. The device of claim 14, wherein the processor is further configured to control the user interface to obtain the attribute information comprising a degree of importance and a degree of difficulty of the review content.

21. The device of claim 14, further comprising a sensor configured to detect a user reference operation on the review content;
wherein the processor is further configured to change a selection time when the review content is selected to a review time when the user reference operation is detected in response to the reference operation being detected, increase a reference number of times after the selection time is changed to the review time, and re-determine the probability based on the changed review time and the increased reference number of times.

22. The device of claim 21, wherein the processor is further configured to determine a recommendation review time of the review content based on the redetermined probability.

23. The device of claim 14, wherein the processor is further configured to control the display to display a plurality of pieces of review content and content displaying information regarding one or more parameters for determining a probability that the review content remains in the user's memory for each of the plurality of pieces of review content.

24. The device of claim 14, wherein the processor is further configured to control the display to display one or more pieces of review content of a plurality of pieces of content stored on the device and a probability that the review content remains in the user's memory for the one or more pieces of review content.

25. The device of claim 14, wherein the processor is further configured to extract one or more pieces of review content provided with identification information from content displayed on the device.

* * * * *